(12) United States Patent
Shao et al.

(10) Patent No.: US 12,245,239 B2
(45) Date of Patent: Mar. 4, 2025

(54) TRANSMISSION METHOD AND APPARATUS, DEVICE, AND STORAGE MEDIUM

(71) Applicant: ZTE CORPORATION, Shenzhen (CN)

(72) Inventors: Shijia Shao, Shenzhen (CN); Chuangxin Jiang, Shenzhen (CN); Shujuan Zhang, Shenzhen (CN); Huahua Xiao, Shenzhen (CN); Zhaohua Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 304 days.

(21) Appl. No.: 17/758,104

(22) PCT Filed: Mar. 24, 2021

(86) PCT No.: PCT/CN2021/082810
§ 371 (c)(1),
(2) Date: Jun. 28, 2022

(87) PCT Pub. No.: WO2021/190577
PCT Pub. Date: Sep. 30, 2021

(65) Prior Publication Data
US 2023/0085606 A1 Mar. 16, 2023

(30) Foreign Application Priority Data
Mar. 25, 2020 (CN) .......................... 202010220361.2

(51) Int. Cl.
*H04W 72/12* (2023.01)
*H04B 1/713* (2011.01)
(Continued)

(52) U.S. Cl.
CPC ............ *H04W 72/21* (2023.01); *H04B 1/713* (2013.01); *H04L 1/08* (2013.01)

(58) Field of Classification Search
CPC ..... H04W 72/21; H04W 72/20; H04W 72/23; H04W 72/231; H04L 1/08; H04L 1/1858;
(Continued)

(56) References Cited

U.S. PATENT DOCUMENTS

2019/0068268 A1* 2/2019 Zhang .................. H04B 7/0626
2019/0313342 A1* 10/2019 Papasakellariou .... H04W 52/48
(Continued)

FOREIGN PATENT DOCUMENTS

| CN | 110312318 A | | 10/2019 | |
|---|---|---|---|---|
| CN | 110536394 A | * | 12/2019 | ........... H04L 5/0023 |

(Continued)

OTHER PUBLICATIONS

3GPP Technical Specification Group Radio Access Network. "Discussion on URLLC reliability/robustness enhancement with multi-TRP/panel," 3GPP TSG RAN WG1 Ad-Hoc Meeting 1901, Jan. 2019, pp. 1-2.
(Continued)

*Primary Examiner* — Phong La
(74) *Attorney, Agent, or Firm* — Vivacqua Crane, PLLC

(57) ABSTRACT

A transmission method and apparatus, a device, and a non-transitory computer-readable storage medium are disclosed. The method may include: acquiring a physical uplink control channel (PUCCH) parameter, and performing at least one PUCCH repetition transmission according to the PUCCH parameter, where the parameter is configured by higher-layer signaling, and comprises at least one of: a plurality of spatial relation information groups, or a fre-
(Continued)

quency hopping transmission parameter, each piece of spatial relation information corresponding to a set of power control parameters.

18 Claims, 12 Drawing Sheets

(51) Int. Cl.
*H04L 1/08* (2006.01)
*H04W 72/21* (2023.01)

(58) Field of Classification Search
CPC .......... H04L 1/189; H04L 1/12; H04B 1/713; H04B 1/7136; H04B 1/71365
See application file for complete search history.

(56) References Cited

U.S. PATENT DOCUMENTS

| | | | |
|---|---|---|---|
| 2020/0314860 A1* | 10/2020 | Zhou | H04W 72/23 |
| 2020/0322893 A1 | 10/2020 | Yao et al. | |
| 2021/0144703 A1 | 5/2021 | Jung et al. | |
| 2021/0184824 A1* | 6/2021 | Kwak | H04L 5/0094 |
| 2021/0218437 A1* | 7/2021 | Khoshnevisan | H04L 1/08 |
| 2022/0330230 A1* | 10/2022 | Takahashi | H04L 5/0094 |
| 2022/0394744 A1* | 12/2022 | Lee | H04L 1/1893 |
| 2022/0416957 A1 | 12/2022 | Shao et al. | |
| 2023/0053430 A1* | 2/2023 | Määttänen | H04B 7/0404 |
| 2023/0064325 A1* | 3/2023 | Määttänen | H04L 5/0048 |
| 2023/0085606 A1* | 3/2023 | Shao | H04L 5/0012 |
| | | | 370/329 |

FOREIGN PATENT DOCUMENTS

| | | | | |
|---|---|---|---|---|
| CN | 110536399 | A | | 12/2019 |
| CN | 111092697 | A | | 5/2020 |
| CN | 111901870 | A | | 11/2020 |
| CN | 110535601 | B | * | 10/2023 .......... H04L 5/0023 |
| EP | 3829238 | A1 | | 6/2021 |
| WO | 2019029381 | A1 | | 2/2019 |
| WO | 2020020128 | A1 | | 1/2020 |
| WO | 2020048443 | A1 | | 3/2020 |
| WO | WO-2020165997 | A1 | * | 8/2020 .......... H04L 5/0044 |
| WO | 2021012163 | A1 | | 1/2021 |

OTHER PUBLICATIONS

3GPP Technical Specification Group Radio Access Network. "Feature lead summary #3 of Enhancements on Multi-beam Operations," 3GPP TSG RAN WG1 Meeting #97, May 2019, pp. 1-35.
3GPP Technical Specification Group Radio Access Network. "Physical layer procedures for control (Release 15)," 3GPP TS 38.213, vol. 15.3.0, 2018, pp. 1-101.
European Patent Office. Extended European Search Report for EP Application No. 21774379.8, mailed Oct. 4, 2023, pp. 1-10.
3GPP Technical Specification Group Radio Access Network. "Design of long-PUCCH over multiple slots," 3GPP TSG-RAN WG1 Meeting, Oct. 9-13, 2017, pp. 1-7.
3GPP Technical Specification Group Radio Access Network. "Discussion on multi-slot NR PUCCH," 3GPP TSG-RAN WG4 Meeting, Apr. 8-12, 2019, pp. 1-2.
International Searching Authority. International Search Report and Written Opinion for PCT Application No. PCT/CN2021/082810 and English translation, mailed Jun. 24, 2021, pp. 1-14.
3GPP Technical Specification Group Radio Access Network. "Summary of 7.1.3—Maintenance of UCI Multiplexing on PUCCH," 3GPP TSG-RAN WG1 Meeting #96, 2019, pp. 1-7.
The State Intellectual Property Office of People's Republic of China. First Office Action and Search Report for CN Application No. 202010220361.2 and English translation, mailed Aug. 26, 2024, pp. 1-30.
3GPP Technical Specification Group Radio Access Network. "Change Request: Correction to PUCCH-Config," 3GPP TSG-RAN WG2 NR Meeting #103, 2018, pp. 1-5.
3GPP Technical Specification Group Radio Access Network. "Consideration on multi-TRP/panel transmission," 3GPP TSG-RAN WG1 Meeting #96bis, 2019, pp. 1-14.
3GPP Technical Specification Group Radio Access Network. "Enhancements on multi-TRP/panel transmission," 3GPP TSG RAN WG1 Meeting #98bis, 2019, pp. 1-32.
Korean Intellectual Property Office. Office Action for KR Application No. 10-2022-7022361 and English translation, mailed Dec. 18, 2024, pp. 1-10.

* cited by examiner

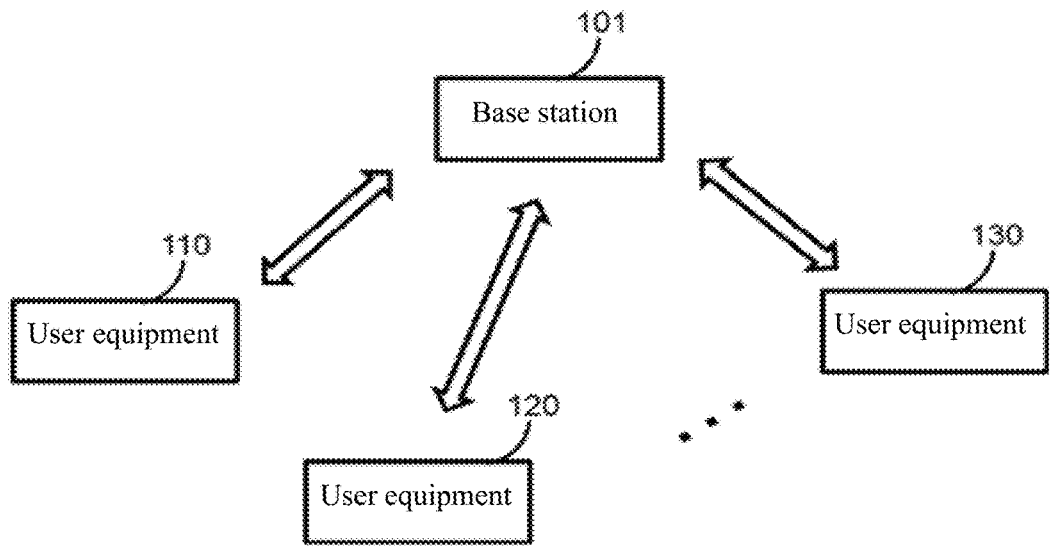

Fig. 1

Acquire a physical uplink control channel (PUCCH) parameter, and perform at least one PUCCH repetition transmission according to the PUCCH parameter, where the parameter is configured by higher-layer signaling, and includes at least one of: a plurality of spatial relation information groups, or a frequency hopping transmission parameter, each piece of spatial relation information corresponding to a set of power control parameters — S21

Fig. 2

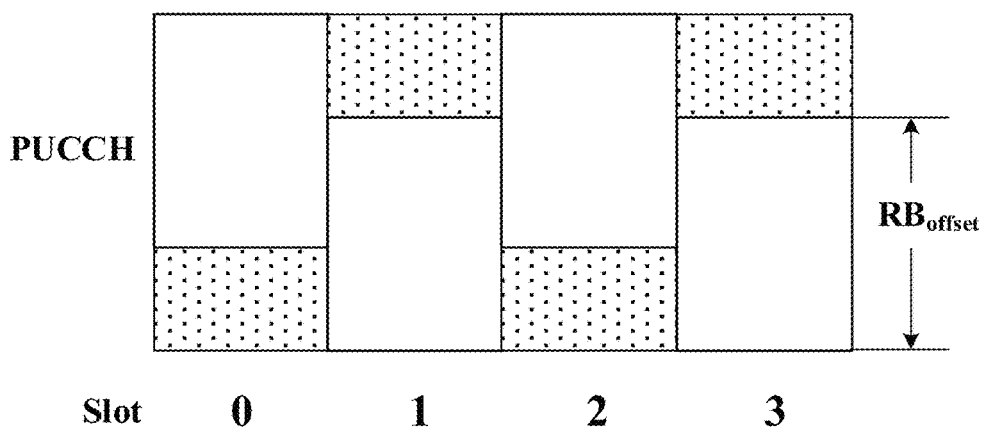

Fig. 3

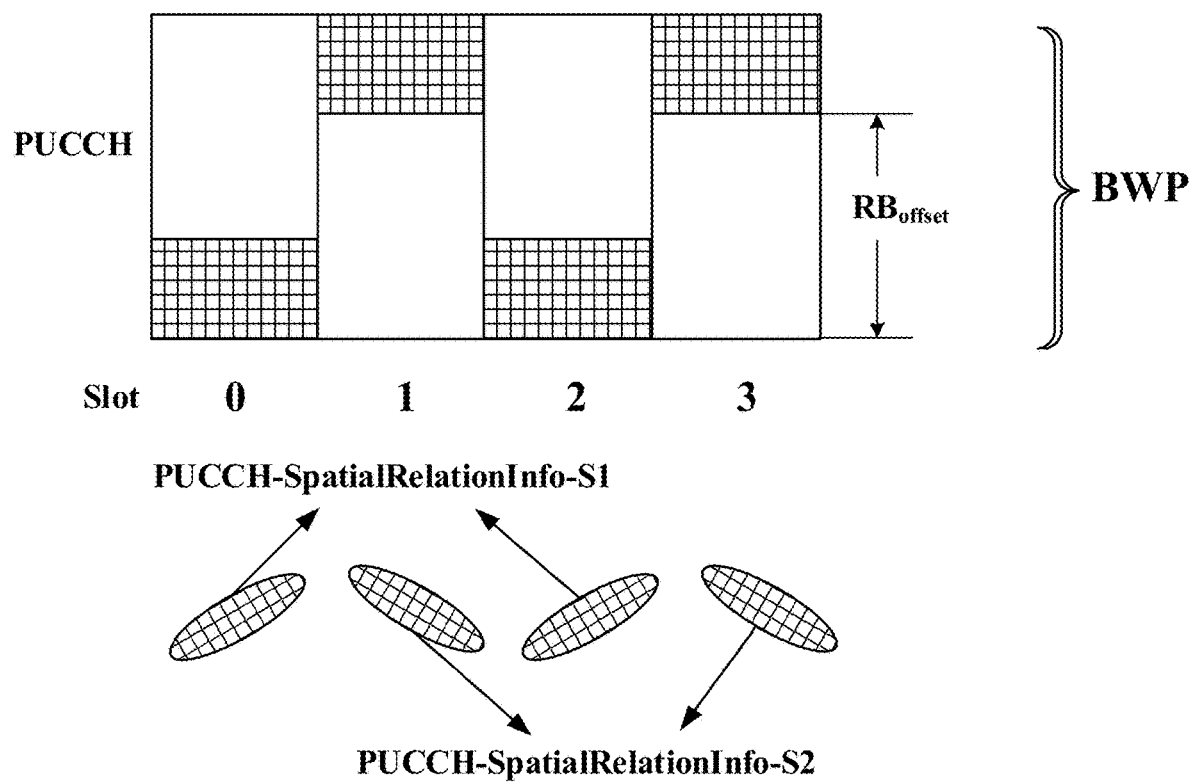

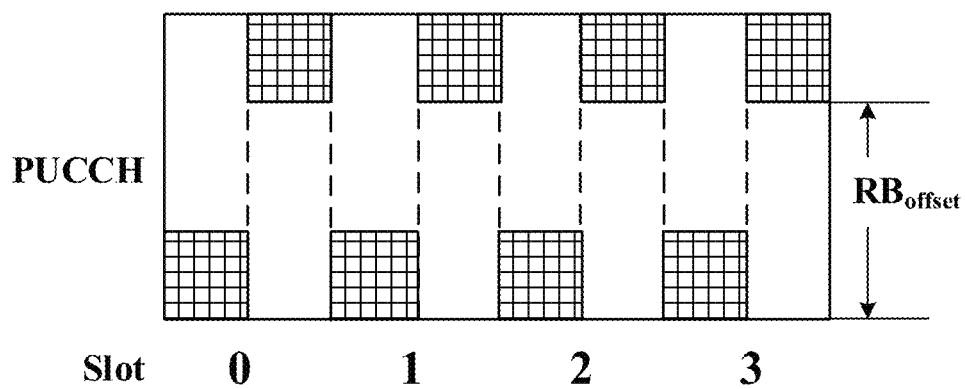
Fig. 10
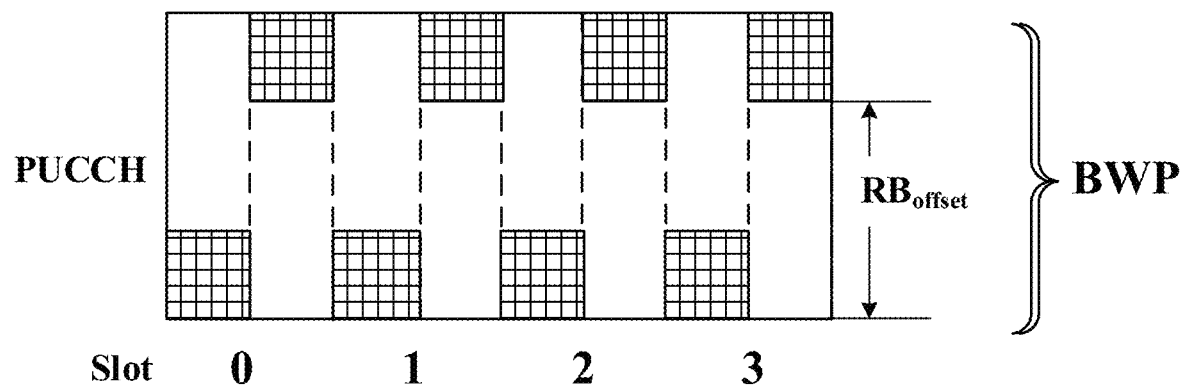
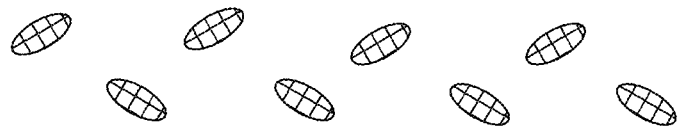
Fig. 11

Slot number  0   1   2   3   4   5

0   1   2   3

PUCCH

Slot  0   1   2   3   4

TRANSMISSION METHOD AND APPARATUS, DEVICE, AND STORAGE MEDIUM

CROSS-REFERENCE TO RELATED APPLICATION

This application is a national stage filing under 35 U.S.C. § 371 of international application number PCT/CN2021/082810, filed Mar. 24, 2021, which claims priority to Chinese patent application No. 202010220361.2, filed on Mar. 25, 2020. The contents of the international application are incorporated herein by reference in their entirety.

TECHNICAL FIELD

The present disclosure relates to radio communication networks, for example, to a transmission method and apparatus, a device and a non-transitory computer-readable storage medium.

BACKGROUND

In the 5th Generation (5G) mobile communications technology system, repetition transmission or reception using the multiple transmission and reception point (Multi-TRP) joint transmission technology or multiple panel (Multi-Panel) transmission technology can improve a probability of receiving correct information by a receive end, thereby effectively improving transmission reliability in an Ultra Reliable and Low Latency Communications (URLLC) scenario. However, in the existing technology, there are still some problems to be solved in uplink control channel transmission in Multi-TRP or Multi-Panel.

SUMMARY

The present disclosure provides a transmission method and apparatus, a device, and a non-transitory computer-readable storage medium.

An embodiment of the present disclosure provides a transmission method, which may include: acquiring physical uplink control channel (PUCCH) parameters and performing at least one slot repetition transmission according to the PUCCH parameters, where the parameter is configured by higher-layer signaling, and includes at least one of: a plurality of spatial relation information groups, or a frequency hopping transmission parameter; each piece of spatial relation information corresponding to a set of power control parameters.

An embodiment of the present disclosure provides a transmission apparatus, which may include a transmission module configured to acquire PUCCH parameters and perform at least one slot repetition transmission according to the PUCCH parameters, where the parameter is configured by higher-layer signaling, and includes at least one of: a plurality of spatial relation information groups, or a frequency hopping transmission parameter; each piece of spatial relation information corresponding to a set of power control parameters.

An embodiment of the present disclosure provides a device, which may include: at least one processor; and a memory configured to store at least one program, where the at least one program, when executed by the at least one processor, causes the at least one processor to implement the method according to any of the embodiments of the present disclosure.

An embodiment of the present disclosure provides a non-transitory computer-readable storage medium storing a computer program which, when executed by a processor, causes the processor to implement any of the methods according to the embodiments of the present disclosure.

The above embodiments and other aspects and the implementations thereof in the present disclosure are further described in the brief description of drawings, the detailed description, and the appended claims.

BRIEF DESCRIPTION OF DRAWINGS

FIG. 1 is a schematic diagram of a radio network system;

FIG. 2 is a flowchart of a transmission method provided by an embodiment of the present disclosure;

FIG. 3 is a schematic diagram of inter-slot frequency hopping provided by an embodiment of the present disclosure;

FIG. 4 is a schematic diagram of a bitmap provided by an embodiment of the present disclosure;

FIG. 5 is a schematic diagram of a manner of sending beams by user equipment (UE) provided by an embodiment of the present disclosure;

FIG. 10 is a schematic diagram of intra-slot frequency hopping provided by an embodiment of the present disclosure;

FIG. 11 is a schematic diagram of a manner of sending beams by UE provided by an embodiment of the present disclosure;

DETAILED DESCRIPTION

Figure 6:
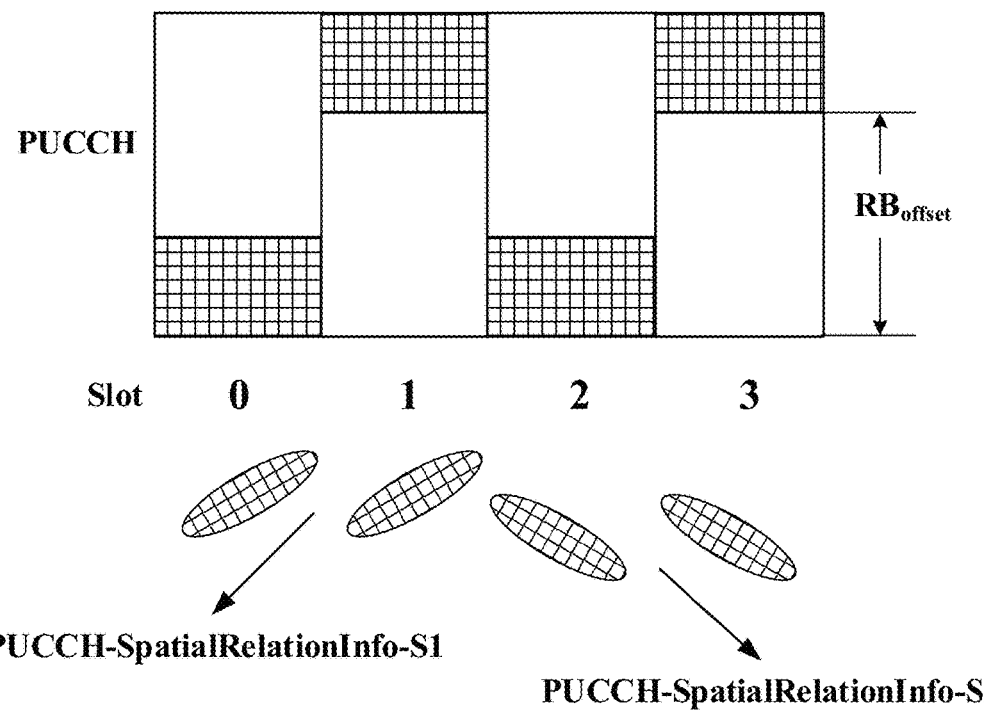
FIG. 6 is a schematic diagram of a manner of sending beams by UE provided by an embodiment of the present disclosure.

The embodiments of the present disclosure will be described below with reference to the accompanying drawings.

The steps shown in the flowcharts of the drawings may be performed in a computer system, such as with a set of computer-executable instructions. Although a logical order is shown in the flowcharts, the steps shown or described may be performed, in some cases, in a different order from the order shown or described herein.

The technical scheme of the present disclosure may be applied to various communication systems, such as: a Global System for Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an Advanced Long Term Evolution (LIE-A) system, a Universal Mobile Telecommunication System (UMTS), a 5G system, etc., which are not limited in the embodiments of the present disclosure. In the present disclosure, a 5G system is used as an example for illustration.

Embodiments of the present disclosure may be applied to radio networks of different modes. The radio access networks may include different communication nodes in different systems. FIG. 1 is a schematic diagram of a radio network system. As shown in FIG. 1, the radio network system 100 includes a base station 101, user equipment 110, user equipment 120, and user equipment 130. The base station 101 is in radio communication with the user equipment 110, the user equipment 120, and the user equipment 130, respectively.

Firstly, in the embodiments of the present disclosure, the base station may be any device capable of communicating with a user terminal. The base station may be any device having a wireless transceiver function, including but not limited to: a NodeB (NB), an evolved NodeB (eNodeB), a base station in a 5G communication system, a base station in a future communication system, an access node in a Wireless Fidelity (WiFi) system, a wireless relay node, a wireless backhaul node, etc. Alternatively, the base station may be a radio controller in a cloud radio access network (C-RAN) scenario; or the base station may be a small station, a Transmission and Reception Point (TRP), etc., which is not limited in the embodiments of the present disclosure.

In the embodiments of the present disclosure, the user terminal is a device with radio transceiver functions that may be deployed on land, including indoor or outdoor, handheld, wearable or vehicle-mounted terminals; or may be deployed on water (e.g., on ships, etc.); or may be deployed in the air (e.g., on aircraft, balloons, satellites, etc.). The user terminal may be a mobile phone, a Pad, a computer with the radio transceiver function, a virtual reality (VR) terminal, an augmented reality (AR) terminal, a wireless terminal in industrial control, a wireless terminal in self-driving, a wireless terminal in remote medical, a wireless terminal in smart grid, a wireless terminal in transportation safety, a wireless terminal in smart city, a wireless terminal in smart home, etc. The application scenario is not limited in the embodiments of the present disclosure. The user terminal may sometimes be called a terminal, an access terminal, a UE unit, a UE station, a mobile radio station, a mobile station, a remote station, a remote terminal, a mobile device, a UE terminal, a radio communication device, a UE agent, or a UE apparatus, and the like, which is not limited in the embodiments of the present disclosure.

The Multi-TRP joint transmission technology, which utilizes multi-TRP transmission to effectively improve a transmission throughput in Long Term Evolution (LTE), Long Term Evolution-Advanced (LTE-A) and New Radio Access Technology (NR) in an enhanced Mobile Broadband (eMBB) scenario. Another technology of NR is Multi-Panel transmission, which uses multiple antenna panels for transmission to obtain higher spectral efficiency. Further, by virtue of repetition transmission or reception in Multi-TRP or Multi-Panel, a probability of receiving correct information by a receive end can be improved, thereby effectively improving transmission reliability in a URLLC scenario. However, in the existing technology, there are still some problems to be solved in uplink control channel transmission in Multi-TRP or Multi-Panel.

For the convenience of description, some concepts used herein are introduced below.

Contents transmitted in NR may include data and signaling.

Physical channels used for transmitting signaling include a Physical Downlink Control Channel (PDCCH) and a PUCCH. PDCCH is mainly used for transmitting physical downlink control information (DCI), while PUCCH is mainly used for transmitting uplink control information (UCI), such as channel state information (CSI), hybrid automatic repeat request (HARQ), scheduling request, etc.

Physical channels used for transmitting data include a Physical Downlink Shared Channel (PDSCH) and a Physical Uplink Shared Channel (PUSCH). PDSCH is mainly used for transmitting downlink data, while PUSCH is mainly used for transmitting uplink data and some uplink control information.

In order to obtain a spatial hierarchical gain, transmission may be performed through multiple beams, and which beam is used for transmission or reception depends on a beam indication in beam management. When using an analog beamforming mode for downlink transmission, a base station needs to indicate a sequence number of a downlink analog transmit beam selected by UE. After receiving the indication, the UE invokes, according to information stored in a beam training and pairing process, an optimal receive beam corresponding to the sequence number to perform downlink reception. When the base station instructs the UE to use the analog beamforming mode for uplink transmission, the base station needs to indicate to auxiliary information of an uplink analog transmit beam for the UE. After receiving the auxiliary information, the UE performs uplink transmission according to the uplink analog transmit beam indicated by the base station, so that the base station can invoke, according to the information stored in the beam training and pairing process, a receive beam corresponding to the transmit beam to perform uplink reception. For an uplink beam indication for the PUCCH, firstly, PUCCH radio resources are configured. Different PUCCH resources are semi-statically configured with different transmit beam directions. By selecting PUCCH radio resources, different transmit beam directions are selected to realize beam switching in multiple directions.

In order to improve the reliability of data or signaling transmission, one way is the repetition transmission. Repeat transmission of M data (e.g., PDSCH or PUSCH) means that the M data carry exactly the same information. For example, the M data come from the same transport block (TB), but have different or individual redundancy versions (RVs) after channel coding, or even have the same RV after channel coding. Here, the RVs refer to different redundancy versions obtained after channel coding of transmitted data. In general, a redundancy version {0, 1, 2, 3} may be used. Likewise, repetition transmission of M signaling (e.g., PDCCH or PUCCH) means that the M signaling carries the same content. For example, DCI contents carried by M PDCCHs are the same (for example, values of fields are the same), and UCI contents carried by M PUCCH are the same. M repetition data (for example, M repetition PUSCHs or M repetition PDSCHs) or M repetition signaling (for example, M repetition PUCCHs or M repetition PDCCHs) may come from N different TRPs, N different antenna panels, N different bandwidth part (BWP), or N different carrier components (CC), where the N panels, N BWPs, or N CCs may belong to a same TRP or belong to multiple TRPs. Repeat transmission schemes include, but are not limited to, at least one of: Scheme 1 of space division multiplexing, Scheme 2 of frequency division multiplexing, Scheme 3 of intra-slot time division multiplexing, or Scheme 4 of inter-slot time division multiplexing. Any combination of the above multiplexing modes may be adopted, such as a combination of space division multiplexing and frequency division multiplexing, a combination of time division multiplexing and frequency division multiplexing, etc.

BWP is defined as a combination of successive resource blocks (RB) in a carrier. The BWP is introduced to make UE better use a large carrier bandwidth. For a large carrier bandwidth, bandwidth available one UE is often very limited. If the UE is allowed to monitor and maintain the full bandwidth, a terminal will consume a lot of energy. The introduction of BWP is to specify a bandwidth part in the whole large carrier bandwidth for the UE to perform access and data transmission. The UE only needs to perform a corresponding operation in the bandwidth part configured by a system.

Power control is an important means to improve a channel capacity, reduce interference and save energy in a wireless communications system. On the one hand, a high enough transmission power helps apply a higher Modulation and Coding Scheme (MCS), increase transmission bits, improve a transmission success rate and Quality of Service (QoS), and reduce a bit error rate and a packet loss rate. On the other hand, an excessive transmission power causes interference to other transmissions in the same time-frequency resource and increases energy consumption. NR uplink follows a basic power control technology of LTE, that is, Fractional Power Control (FPC). On an uplink carrier of a given serving cell, the FPC mainly includes an open-loop power control part, a closed-loop power control part, and another adjusting variable. The open-loop part includes a target receiver power value, a path loss estimation and a partial path loss compensation factor. The closed-loop part includes a power control adjustment state, which can quickly adjust a transmission power for one transmission of one UE. Another adjusting variable is closely related to resource allocation and link adaptation.

In the embodiments listed in the present disclosure, If not otherwise specified, one terminal and at least two TRPs (or one TRP and one UE including at least one panel) are included, and N PUCCHs transmitted by the UE are repetitive. In the present disclosure, the N PUCCH repetition transmissions are performed in a time division multiplexing manner for internal use.

In an embodiment, the present disclosure provides a transmission method. FIG. 2 is a schematic flowchart of a transmission method provided by an embodiment of the present disclosure. The method may be applied to a case of repetition transmission between a base station and a terminal. The method may be performed by a transmission apparatus provided by the present disclosure, and the transmission apparatus may be implemented by software and/or hardware.

The transmission method provided in the embodiment is mainly applied to UE.

As shown in FIG. 2, the transmission method provided by the embodiment of the present disclosure mainly includes step S21.

At S21, PUCCH parameters are acquired and at least one slot repetition transmission is performed according to the PUCCH parameters, where the parameter is configured by higher-layer signaling, and includes at least one of: a plurality of spatial relation information groups, or a frequency hopping transmission parameter; each piece of spatial relation information corresponding to a set of power control parameters.

In this embodiment, frequency hopping means continuous hopping of a carrier frequency. The use of frequency hopping can expand an effective spectrum, improve an anti-interference ability, and improve reliability of transmission.

The power control parameters are parameters which can adjust a transmission power of a beam. Different power control parameters selected can optimize beam transmission performance and improve the anti-interference ability.

The higher-layer signaling is configured by the base station and transmitted to the UE through a Radio Resource Control (RRC) message.

In an illustrative implementation, in response to multiple PUCCH repetition transmissions being in a same BWP, a medium access control-control element (MAC-CE) pairs the configured spatial relation information to generate N new spatial relation information groups.

Pairing spatial relation information means pairing N spatial relation information in pairs to generate N new spatial relation information groups. The spatial relation information group includes two pieces of spatial relation information. N is a positive integer. Optional, N is 8.

For example: the configured spatial relation information is S0-S7, and the spatial relation information groups generated by pairing the spatial relation information include (S0, S1), (S1, S2), (S2, S3), (S3, S4), (S4, S5), (S5, S6), (S6, S7), and (S7, S7).

MAC-CE activation states correspond to the different spatial relation information groups.

For example: MAC-CE activation states S0-S7 correspond to the spatial relation information groups (S0, 51), (S1, S2), (S2, S3), (S3, S4), (S4, S5) (S5, S6) (S6, S7) (S7, S7), respectively.

The above correspondences are only illustrative descriptions than limitations.

A transmit beam for the UE is determined by spatial relation information in a spatial relation information group activated by the MAC-CE.

A transmit beam for the UE is determined by first spatial relation information and second spatial relation information in the spatial relation information group, where the first spatial relation information and the second spatial relation information are the same, or the first spatial relation information and the second spatial relation information are different.

When the MAC-CE activates S1 for the UE, the transmit beam for the UE is determined by S1 and S2. When the MAC-CE activates S7 for the UE, the transmit beam for the UE is only determined by S7, where the transmit beam for the UE refers to a spatial relation used to transmit PUCCH or PUSCH.

The first spatial relation information and the second spatial relation information are only two pieces of identical or different spatial relation information in the spatial relation information group. The terms of first and second do not have the meaning of actual quantity or arrangement, but only distinguish between the spatial relation information.

In response to the frequency hopping mode being inter-slot frequency hopping and there being M repetition transmissions, a PUCCH transmit beam in an even-numbered slot is determined by the first spatial relation information in the spatial relation information group; and a PUCCH transmit beam in an odd-numbered slot is determined by the second spatial relation information in the spatial relation information group.

In response to the frequency hopping mode being inter-slot frequency hopping and there being M repetition transmissions, a PUCCH transmit beam in the first M/2 slots is determined by the first spatial relation information in the spatial relation information group; and a PUCCH transmit beam in the remaining slots is determined by the second spatial relation information in the spatial relation information group.

In response to a frequency hopping mode being intra-slot frequency hopping and there being M repetition transmissions, a PUCCH transmit beam on an even-numbered frequency hopping unit is determined by the first spatial relation information in the spatial relation information group; and a PUCCH transmit beam on an odd-numbered frequency hopping unit is determined by the second spatial relation information in the spatial relation information group.

In response to a frequency hopping mode being intra-slot frequency hopping and there being M repetition transmissions, a PUCCH transmit beam in the first M/2 frequency hopping units is determined by the first spatial relation information in the spatial relation information group; and a PUCCH transmit beam in the remaining frequency hopping units is determined by the second spatial relation information in the spatial relation information group.

In an illustrative implementation, in response to PUCCH repetition frequency hopping transmissions being in different BWPs, spatial relation information configured for the different BWPs is paired to generate N new spatial relation information groups.

The PUCCH repetition frequency hopping transmissions being in different BWPs may be understood as PUCCH cross-BWP repetition transmissions.

When PUCCH is transmitted by cross-BWP frequency hopping, the first frequency hopping unit configures N higher-layer parameters, PUCCH-SpatialRelationInfo0, for PUCCH in a BWP 0, and the second frequency hopping unit configures another N higher-layer parameters, PUCCH-SpatialRelationInfo1, for PUCCH in a BWP 1. In this case, these two sets of PUCCH-SpatialRelationInfo0 and PUCCH-SpatialRelationInfo1 are paired to produce N new PUCCH-SpatialRelationInfo groups. N is a positive integer. Optional, N is 8. A grouping manner of inter-slot frequency hopping may be reused, or a new grouping manner is used.

The transmit beam for the UE is determined by third spatial relation information and fourth spatial relation information in a spatial relation information group, where the third spatial relation information corresponds to a first BWP, and the fourth spatial relation information corresponds to a second BWP.

In response to the frequency hopping mode being inter-slot frequency hopping and there being M repetition transmissions, a PUCCH transmit beam for the UE is determined by the third spatial relation information in the spatial relation information group; and a transmit beam for the PUCCH, in a slot in the second BWP, for the UE is determined by the fourth spatial relation information in the spatial relation information group.

The third spatial relation information and the fourth spatial relation information are only two pieces of identical or different spatial relation information in the spatial relation information group. The terms of third and fourth do not have the meaning of actual quantity or arrangement, but only distinguish between the spatial relation information.

In response to the frequency hopping being intra-slot frequency hopping and M transmissions being performed, a PUCCH transmit beam for the UE on a frequency hopping unit in the first BWP is determined by the third spatial relation information in the spatial relation information group; and a transmit beam for the PUCCH, on a frequency hopping unit in the second BWP, for the UE is determined by the fourth spatial relation information in the spatial relation information group.

In an illustrative implementation, in response to a plurality of beams being configured, a manner of sending the beams by the UE is indicated by at least one of the following indication information: downlink dynamic control information; or higher-layer signaling.

A start beam for a PUCCH in a repetition transmission and the number of PUCCHs transmitted corresponding to the beam are determined based on the at least one indication information.

The start beam and the number of PUCCHs transmitted using the beam are determined by a start beam index corresponding to a pre-configured indicator value index and duration.

A unit of duration corresponding to the start beam is a slot (inter-slot frequency hopping or non-frequency hopping) or a frequency hopping unit (intra-slot frequency hopping).

In an illustrative implementation, in response to a slot failing to meet a PUCCH transmission requirement, a beam after the slot is transmitted in one of the following manners: postponing beams in sequence, that is, keeping an original beam sequence unchanged; or keeping original beams unchanged, that is, deleting a beam corresponding to the slot failing to meet the transmission requirement.

In an illustrative implementation, in response to the base station indicating only a power adjustment factor corresponding to a first beam, a power adjustment factor for a second beam is determined using the power adjustment factor.

The power adjustment factor for the second beam is determined by the power adjustment factor indicated by the base station and a power control parameter corresponding to the first beam.

In response to a path loss of the second beam being greater than a path loss of the first beam and a target reception power of the second beam being less than an adjusted target reception power of the first beam, the power adjustment factor for the second beam is determined by a target reception power of the first beam, the path loss of the first beam, the target reception power of the second beam, and the path loss of the second beam.

In an applicative example, the embodiment is used to describe beam indication in the case of PUCCH inter-slot frequency hopping.

In order to improve coverage of PUCCH, in additional to supporting transmission of long PUCCH, NR further supports repetition transmission of long PUCCH (including format 1/3/4), that is, multi-slot PUCCH aggregation. The number of repetition transmissions $N_{PUCCH}^{repeat}$ may be configured by higher-layer signaling. Multi-slot PUCCH has a same start symbol and duration in slots for repetition transmissions. To obtain a frequency diversity gain, PUCCH inter-slot frequency hopping is additionally introduced in the multi-slot PUCCH. If inter-slot frequency hopping is configured, a configuration of a Physical Resource Block (PRB) index of the first frequency hopping unit (indicated by a starting PRB) is applied to an even-numbered slot index in the multi-slot PUCCH, and a configuration of a PRB index of the second frequency hopping unit (indicated by a second PRB) is applied to an odd-numbered slot index in the multi-slot PUCCH.

FIG. 3 is a schematic diagram of inter-slot frequency hopping provided by an embodiment of the present disclosure. As shown in FIG. 3, an RB in a slot 0 and an RB in a slot 1 are not in a same frequency range, and frequency hopping occurs. Frequency ranges of even-numbered slots are the same, frequency ranges of odd-numbered slots are the same, while a frequency range of an even-numbered slot is different from a frequency range of an odd-numbered slot.

This is mainly used herein to describe how multiple beams are applied to multiple PUCCH repetitions.

It is described in Release 15 (R15) that, in each BWP, PUCCH can be configured with up to 8 higher-layer parameters, PUCCH-SpatialRelationInfo, such parameters including a beam-related reference signal (RS), power control-related parameters PUCCH-PathlossReferenceRS-Id, p0-PUCCH-Id, and ClosedLoopIndex (CLI), and being indicated by MAC-CE signaling, which includes a bitmap of PUCCH-SpatialRelationInfo. A length of the bitmap is 7 bits.

FIG. 4 is a schematic diagram of a bitmap provided by an embodiment of the present disclosure. As shown in FIG. 4, the length of the bitmap including PUCCH-SpatialRelationInfo is 8 bits. Si represents an activation state of PUCCH spatial-relation information corresponding to PUCCH-SpatialRelationInfoIdi. Si with a set value of 1 indicates that the PUCCH spatial-relation information corresponding to PUCCH-SpatialRelationInfoIdi should be activated. Si with a set value of 0 indicates that the PUCCH spatial-relation information corresponding to PUCCH-SpatialRelationInfoIdi should be deactivated. PUCCH spatial-relation information of only one PUCCH resource can be activated at a time.

In Release 17 (R17), a multi-beam transmission mode for PUCCH repetition is considered, to obtain a spatial diversity gain. A corresponding beam configuration is divided into the following two cases.

1. PUCCH is configured with inter-slot frequency hopping without cross-BWP transmission.

When PUCCH repetition transmissions are in a same BWP, n higher-layer parameters, PUCCH-SpatialRelationInfo, are configured for the PUCCH in the activated BWP. In this case, the n PUCCH-SpatialRelationInfo are paired to produce n new PUCCH-SpatialRelationInfo groups. The grouping result may be shown, but is not limited to, the grouping method as shown in Table 1.

TABLE 1

Grouping for the PUCCH-SpatialRelationInfo groups

| MAC-CE activation state | PUCCH-SpatialRelationInfo group index | Activation state of the PUCCH spatial-relation information | Activation state of the PUCCH spatial-relation information |
|---|---|---|---|
| S0 | 0 | S0 | S1 |
| S1 | 1 | S1 | S2 |
| S2 | 2 | S2 | S3 |
| S3 | 3 | S3 | S4 |
| S4 | 4 | S4 | S5 |
| S5 | 5 | S5 | S6 |
| S6 | 6 | S6 | S7 |
| S7 | 7 | S7 | S7 |

Taking the grouping manner in Table 1 as an example, when the MAC-CE activates S1 for the UE, the transmit beam for the UE is determined by S1 and S2. When the number of PUCCH repetition transmissions is configured in the higher-layer such that $N_{PUCCH}^{repeat}=4$, the UE may perform transmission in a circular manner, as shown in FIG. 5.

FIG. 5 is a schematic diagram of a manner of sending beams by UE provided by an embodiment of the present disclosure. As shown in FIG. 5, PUCCH in a slot 0 and a slot 2 is transmitted using S1 activated in PUCCH-SpatialRelationInfo, and PUCCH in the slot 1 and a slot 3 is transmitted using S2 activated in PUCCH-SpatialRelationInfo.

The UE may perform transmission in a sequential manner, as shown in FIG. 6. FIG. 6 is a schematic diagram of a manner of sending beams by UE provided by an embodiment of the present disclosure. As shown in FIG. 6, PUCCH in a slot 0 and a slot 1 is transmitted using S1 activated in PUCCH-SpatialRelationInfo, and PUCCH in the slot 2 and a slot 3 is transmitted using S2 activated in PUCCH-SpatialRelationInfo.

Figure 7:
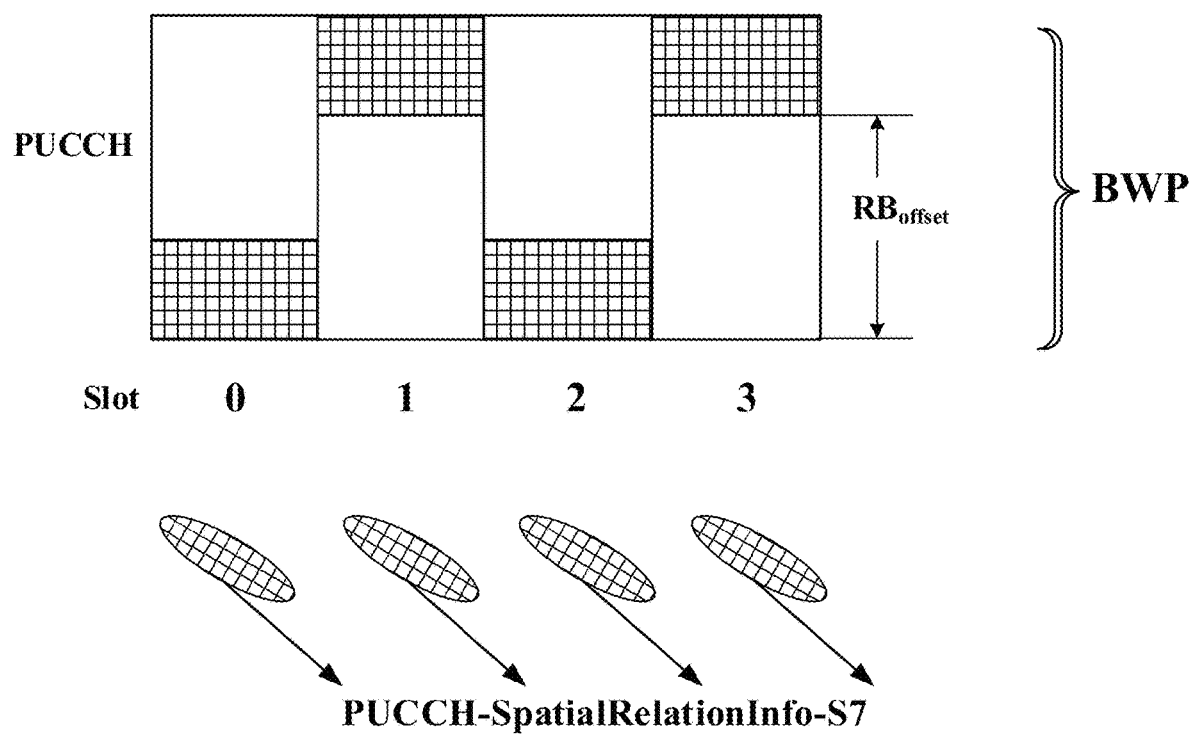
FIG. 7 is a schematic diagram of a manner of sending beams by UE provided by an embodiment of the present disclosure.

When the MAC-CE activates S7 for the UE, the transmit beam for the UE is determined by only S7. When the number of PUCCH repetition transmissions is configured in the higher-layer such that $N_{PUCCH}^{repeat}=4$, a schematic diagram of transmission by the UE may be as shown in FIG. 7. FIG. 7 is a schematic diagram of a manner of sending beams by UE provided by an embodiment of the present disclosure. As shown in FIG. 7, in this case, the UE may use a same beam to transmit PUCCH in different slots without beam switching.

2. PUCCH is configured with inter-slot frequency hopping with cross-BWP transmission.

When PUCCH is transmitted by cross-BWP frequency hopping, the first frequency hopping unit configures n higher-layer parameters, PUCCH-SpatialRelationInfo0, for PUCCH in a BWP 0, and the second frequency hopping unit configures another n higher-layer parameters, PUCCH-SpatialRelationInfo1, for PUCCH in a BWP 1. In this case, these two sets of PUCCH-SpatialRelationInfo0 and PUCCH-SpatialRelationInfo1 are paired to produce n new PUCCH-SpatialRelationInfo groups. The grouping result may be shown, but is not limited to, the grouping method as shown in Table 2.

TABLE 2

Grouping for the PUCCH-SpatialRelationInfo groups

| MAC-CE activation state | PUCCH-SpatialRelationInfo group index | BWP0 Activation state of the PUCCH spatial-relation information | BWP1 Activation state of the PUCCH spatial-relation information |
|---|---|---|---|
| S0 | 0 | S00 | S10 |
| S1 | 1 | S01 | S11 |
| S2 | 2 | S02 | S12 |
| S3 | 3 | S03 | S13 |
| S4 | 4 | S04 | S14 |
| S5 | 5 | S05 | S15 |
| S6 | 6 | S06 | S16 |
| S7 | 7 | S07 | S17 |

The grouping manner of the PUCCH-SpatialRelationInfo group is shown in Table 2, where S0i represents activated Si in PUCCH-SpatialRelationInfo0 of a higher-layer configuration in the BWP 0, and S1i represents activated Si in PUCCH-SpatialRelationInfo1 of a high-level configuration in the BWP 1.

Therefore, when cross-BWP inter-slot frequency hopping is configured for PUCCH, the activation state of the MAC-CE directly corresponds to the PUCCH-SpatialRelationInfo group. For example: the MAC-CE activates S1 for the UE. In this case, a transmit beam for the UE in the BWP 0 is determined by S01, and a transmit beam in the BWP 1 is determined by S11, thus realizing a correspondence between BWP and the beam. When the number of PUCCH repetition transmissions is configured in the higher-layer such that $N_{PUCCH}^{repeat}=4$ a manner of sending beams by the UE is as shown in FIG. 8.

Figure 8:
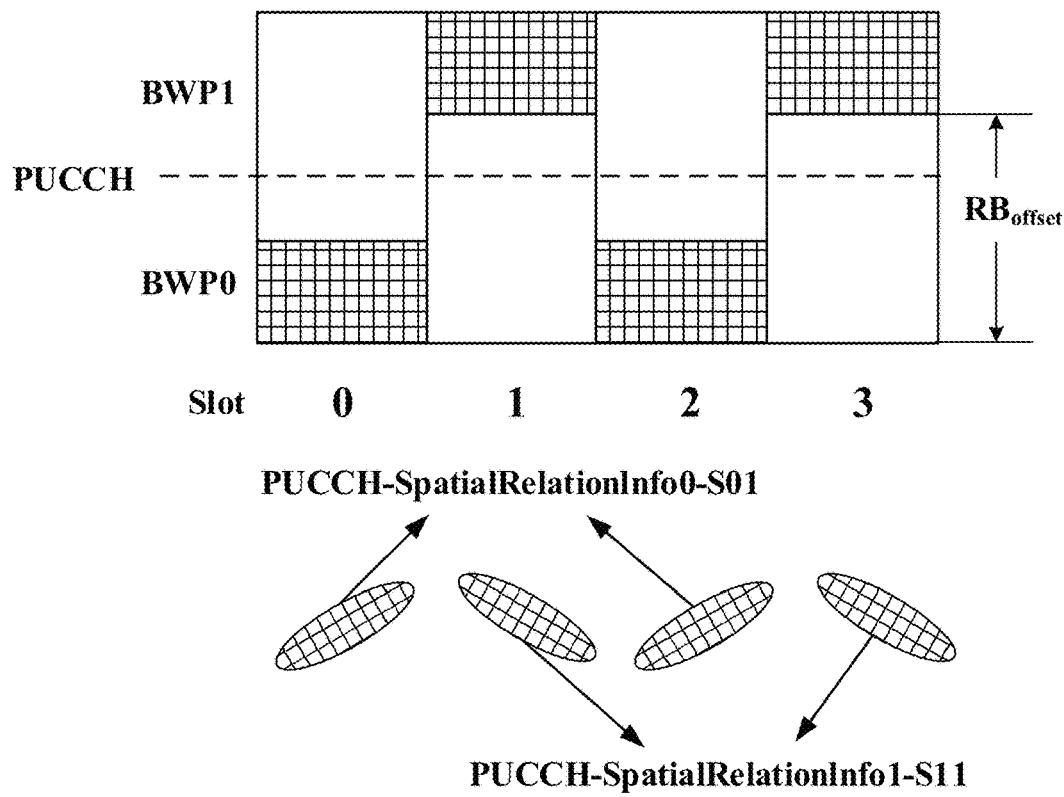
FIG. 8 is a schematic diagram of a manner of sending beams by UE provided by an embodiment of the present disclosure.

FIG. 8 is a schematic diagram of a manner of sending beams by UE provided by an embodiment of the present disclosure. As shown in FIG. 8, PUCCH in an even-numbered slot and PUCCH in an odd-numbered slot are transmitted in different BWPs. To be specific, PUCCH in a slot 0 and a slot 2 uses S01 activated in PUCCH-SpatialRelationInfo0, and PUCCH in a slot 1 and a slot 3 uses S11 activated in PUCCH-SpatialRelationInfo1.

In an applicative example, the embodiment is used to describe beam indication in the case of PUCCH intra-slot frequency hopping.

In LTE, all PUCCH formats has to support frequency hopping to obtain a frequency diversity gain. However, in NR, considering flexibility of a system design, frequency hopping can be configured for all PUCCH formats having 2 or more symbols.

Figure 9:
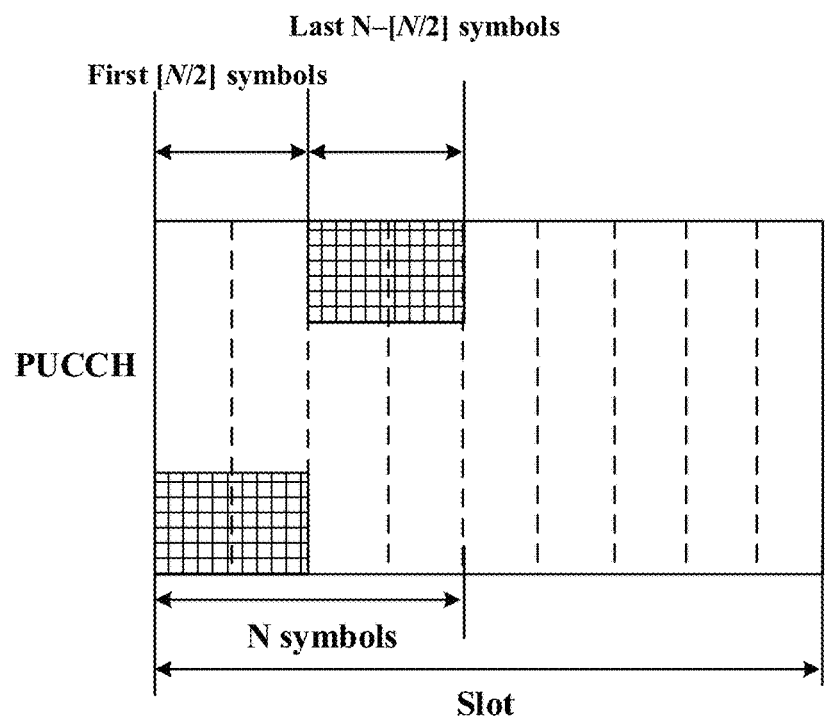
FIG. 9 is a schematic diagram of a frequency hopping unit corresponding to Orthogonal Frequency Division Multiplexing (OFDM) in an embodiment of the present disclosure.

FIG. 9 is a schematic diagram of a frequency hopping unit corresponding to OFDM in an embodiment of the present disclosure. As shown in FIG. 9, for one PUCCH on an OFDM symbol with a length of N, if intra-slot frequency hopping is configured, the number of OFDM symbols of the first frequency hopping unit is $\lfloor N/2 \rfloor$, a configuration of a PRB index being indicated by a starting PRB. The number of OFDM symbols of the second frequency hopping unit is $N-\lfloor N/2 \rfloor$, a configuration of a PRB index being indicated by a second PRB.

FIG. 10 is a schematic diagram of intra-slot frequency hopping provided by an embodiment of the present disclosure. As shown in FIG. 10, to improve coverage of PUCCH, PUCCH may repeat be transmitted on the basis of intra-slot frequency hopping, and the number $N_{PUCCH}^{repeat}$ of repetition transmissions may be configured by higher-layer signaling. Multi-slot PUCCH has a same start symbol and duration in slots for repetition transmissions.

In each BWP, PUCCH can be configured with up to 8 higher-layer parameters, PUCCH-SpatialRelationInfo, indicated by the MAC-CE.

In R17, a multi-beam transmission mode for PUCCH repetition is considered, to obtain a spatial diversity gain. A corresponding beam configuration is divided into the following two cases.

1. PUCCH is configured with intra-slot frequency hopping without cross-BWP transmission.

When PUCCH repetition transmissions are in a same BWP, 8 higher-layer parameters, PUCCH-SpatialRelationInfo, are configured for the PUCCH in the activated BWP. In this case, the 8 PUCCH-SpatialRelationInfo are paired to produce n new PUCCH-SpatialRelationInfo groups. A grouping result of inter-slot frequency hopping may be reused, or a new grouping manner is generated.

Taking the grouping manner in Table 1 as an example, when the MAC-CE activates S1 for the UE, the transmit beam for the UE is determined by S1 and S2. When the number of PUCCH repetition transmissions is configured in the higher-layer such that $N_{PUCCH}^{repeat}=4$, the UE may perform transmission in a circular manner, as shown in FIG. 11.

FIG. 11 is a schematic diagram of a manner of sending beams by UE provided by an embodiment of the present disclosure. As shown in FIG. 11, PUCCH on an even-numbered frequency hopping unit is transmitted using S1 activated in PUCCH-SpatialRelationInfo, and PUCCH on an odd-numbered frequency hopping unit is transmitted using S2 activated in PUCCH-SpatialRelationInfo. The UE, similarly, may perform transmission in a sequential manner.

2. PUCCH is configured with intra-slot frequency hopping with cross-BWP transmission.

When PUCCH is transmitted by cross-BWP frequency hopping, the first frequency hopping unit configures 8 higher-layer parameters, PUCCH-SpatialRelationInfo0, for PUCCH in a BWP 0, and the second frequency hopping unit configures another 8 higher-layer parameters, PUCCH-SpatialRelationInfo1, for PUCCH in a BWP 1. In this case, these two sets of PUCCH-SpatialRelationInfo0 and PUCCH-SpatialRelationInfo1 are paired to produce 8 new PUCCH-SpatialRelationInfo groups. A grouping manner of inter-slot frequency hopping may be reused, or a new grouping manner is used.

The grouping manner of the PUCCH-SpatialRelationInfo group may be as shown in Table 2, but is not limited this manner, where S0i represents activated Si in PUCCH-SpatialRelationInfo0 of a higher-layer configuration in the BWP 0, and S1i represents activated Si in PUCCH-SpatialRelationInfo1 of a high-level configuration in the BWP 1.

Therefore, when cross-BWP intra-slot frequency hopping is configured for PUCCH, the activation state of the MAC-CE directly corresponds to the PUCCH-SpatialRelationInfo group. For example: the MAC-CE activates S1 for the UE. In this case, a transmit beam for the UE in the BWP 0 is determined by S01, and a transmit beam in the BWP 1 is determined by S11. When the number of PUCCH repetition transmissions is configured in the higher-layer such that $N_{PUCCH}^{repeat}=4$ a schematic diagram is as shown in FIG. 12.

Figure 12:
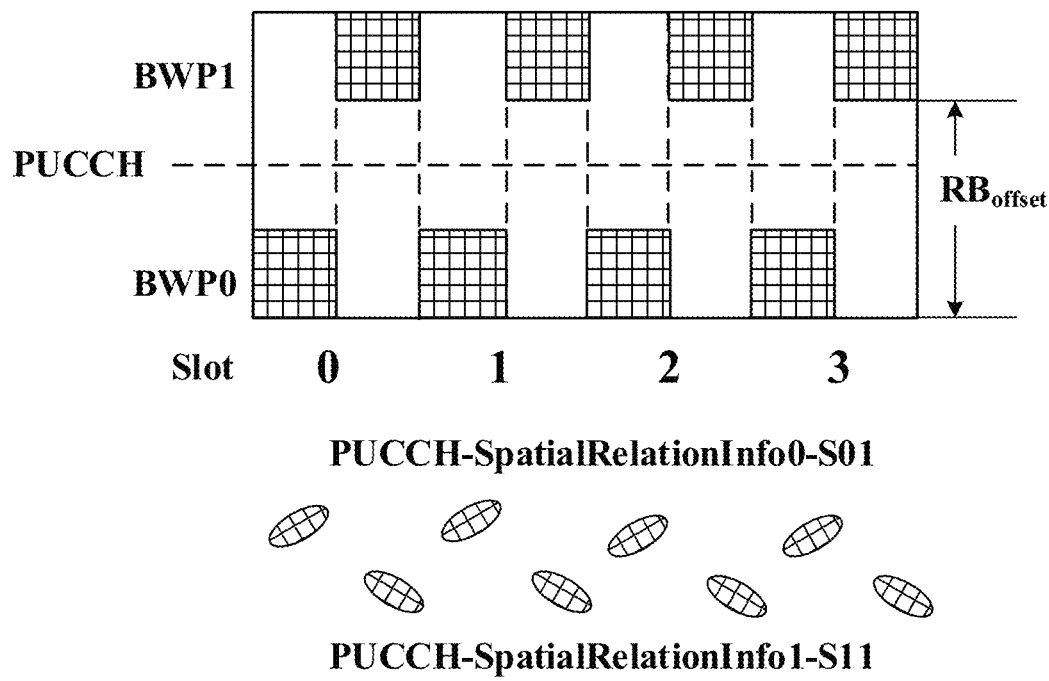
FIG. 12 is a schematic diagram of a manner of sending beams by UE provided by an embodiment of the present disclosure.

FIG. 12 is a schematic diagram of a manner of sending beams by UE provided by an embodiment of the present disclosure. As shown in FIG. 12, PUCCH in an even-numbered slot and PUCCH in an odd-numbered slot are transmitted in different BWPs. To be specific, PUCCH in a slot 0 and a slot 2 uses S01 activated in PUCCH-Spatial- RelationInfo0, and PUCCH in a slot 1 and a slot 3 uses S11 activated in PUCCH-SpatialRelationInfo1.

In an applicative implementation, the embodiment is used to describe beam indication for multi beams in the case of PUCCH repetition transmission.

In the case in which repetition transmission is configured for PUCCH, the MAC-CE configures multiple beams for the UE as can be leaned from the above embodiments.

Figure 13A:
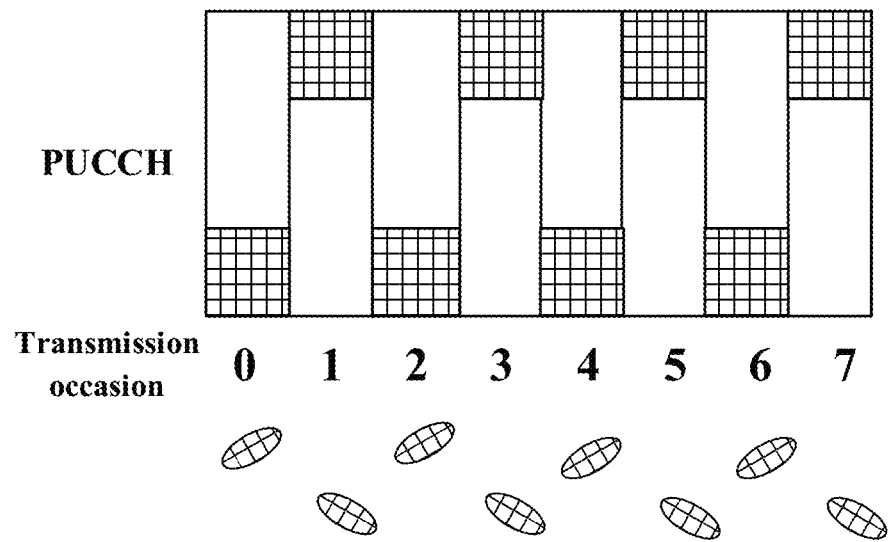
FIG. 13a is a schematic diagram of a beam cyclic transmission mode provided by an embodiment of the present disclosure.
Figure 13B:
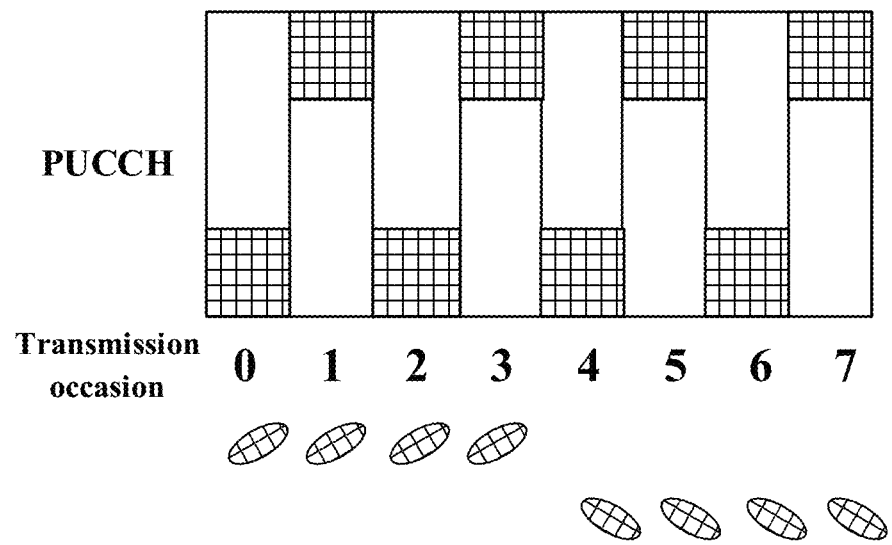
FIG. 13b is a schematic diagram of a beam sequential transmission mode provided by an embodiment of the present disclosure.
Figure 13C:
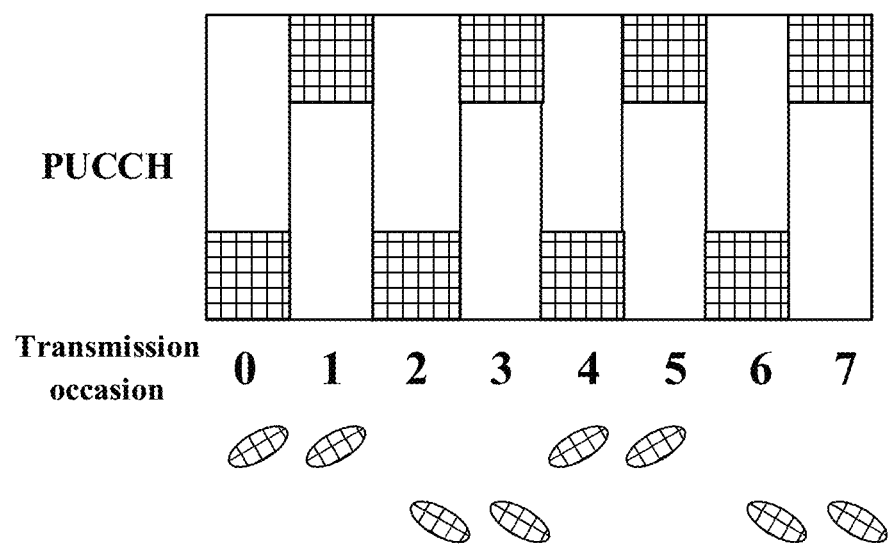
FIG. 13c is a schematic diagram of a beam packet transmission mode provided by an embodiment of the present disclosure.

FIG. 13a is a schematic diagram of a beam cyclic transmission mode provided by an embodiment of the present disclosure; FIG. 13b is a schematic diagram of a beam sequential transmission mode provided by an embodiment of the present disclosure; FIG. 13c is a schematic diagram of a beam packet transmission mode provided by an embodiment of the present disclosure. As shown in FIG. 13a, FIG. 13b, FIG. 13c, the UE may select beams for PUCCH transmission in a cyclic, sequential, and packet manner.

The present disclosure is used to determine how to select a beam transmission mode after multi-beam transmission is configured for the UE.

In R15, in each BWP, PUCCH can be configured up to 8 higher-layer parameters, PUCCH-SpatialRelationInfo, so that the UE can obtain, according to PUCCH-SpatialRelationInfo activated by the MAC-CE, a beam-related reference signal, and power control-related parameters, namely, PUCCH-PathlossReferenceRS-Id, p0-PUCCH-Id and ClosedLoopIndex, to determine a transmit beam and a corresponding transmission power. When the MAC-CE configures multiple beams for the UE, a manner of sending the beam by the UE can be indicated by a start and length indicator value (SLIV) in time domain allocation (it may alternatively be dynamically indicated by a higher-layer indication or DCI).

The UE can obtain, according to this indicator value, a start beam index value S of PUCCH in repetition transmission and duration L corresponding to the beam. The start beam index value S indicates which of the multiple beams indicated by MAC-CE to be used for the first PUCCH transmission. The duration L represents a continuous transmission time using each beam. Considering the existence of inter-slot frequency hopping and intra-slot frequency hopping, a unit of the duration is a minimum of a transmission occasion and a length of the frequency hopping unit, setting of the unit of the duration for the beam is as shown in Table 3.

TABLE 3

Setting of a unit of duration for the beam

| Whether frequency hopping is configured? | Type of frequency hopping | Unit of duration |
|---|---|---|
| Not configured | N/A | Slot |
| Configured | Inter-slot frequency hopping | Slot |
|  | Intra-slot frequency hopping | Frequency hopping unit |

The UE is configured with corresponding a start and length indicator value, where an index value may be selected from a table and indicated to the UE. If a value indicated for the beam is M, the UE can obtain a corresponding start beam and beam duration from the row with an index of (M+1) in this table. The table design is as follows, but it is not limited this design.

TABLE 4

Table of a start and length indicator value

| Indicator value index | Start beam index | Duration |
|---|---|---|
| 0 | 0 | 1 |
| 1 | 0 | 2 |
| 2 | 0 | 4 |
| 3 | 1 | 1 |
| 4 | 1 | 2 |
| 5 | 1 | 4 |

In the case of inter-slot frequency hopping, taking the grouping manner of PUCCH-SpatialRelationInfo in Table 1 as an example, when the MAC-CE activates S1 for the UE, the transmit beam for the UE is determined according to S1 and S2. The transmit beams for the UE determined according to S1 and S2 correspond to beam index values 0 and 1, respectively.

Figure 14:
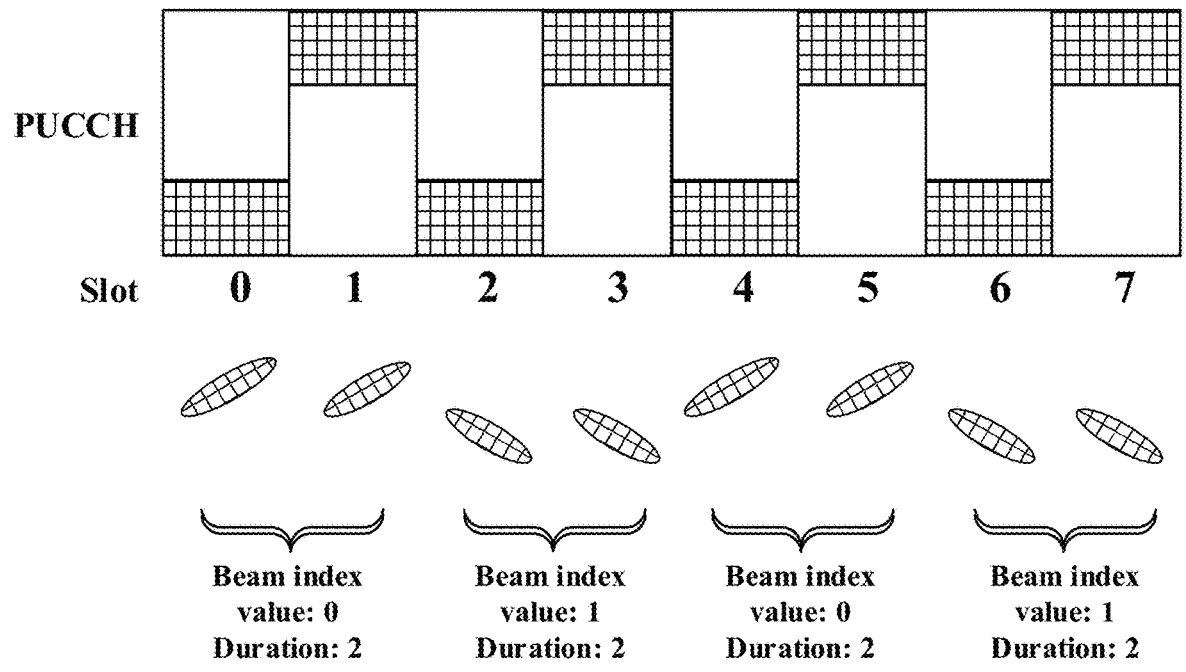
FIG. 14 is a schematic diagram of a beam transmission mode provided by an embodiment of the present disclosure.

When the number of PUCCH repetition transmissions is configured in the higher-layer such that $N_{PUCCH}^{repeat}=8$ and the indicator clue is 1, a manner of sending beams by the UE is as shown in FIG. 14.

FIG. 14 is a schematic diagram of a beam transmission mode provided by an embodiment of the present disclosure. As shown in FIG. 14, when the start and length indicator value is 1, it can be learned from Table 4 that a start beam index is 0, the start beam index 0 corresponds to activated S1 and duration 2, and a unit of the duration in the case of inter-slot frequency hopping is a slot. Therefore, a same beam is used for transmission in a slot 0 and a slot 1. For a slot 3, the beam is switched to a next transmit beam, which is determined according to S2 and then used for transmission in two slots. After that, beam switching is performed.

Figure 15:
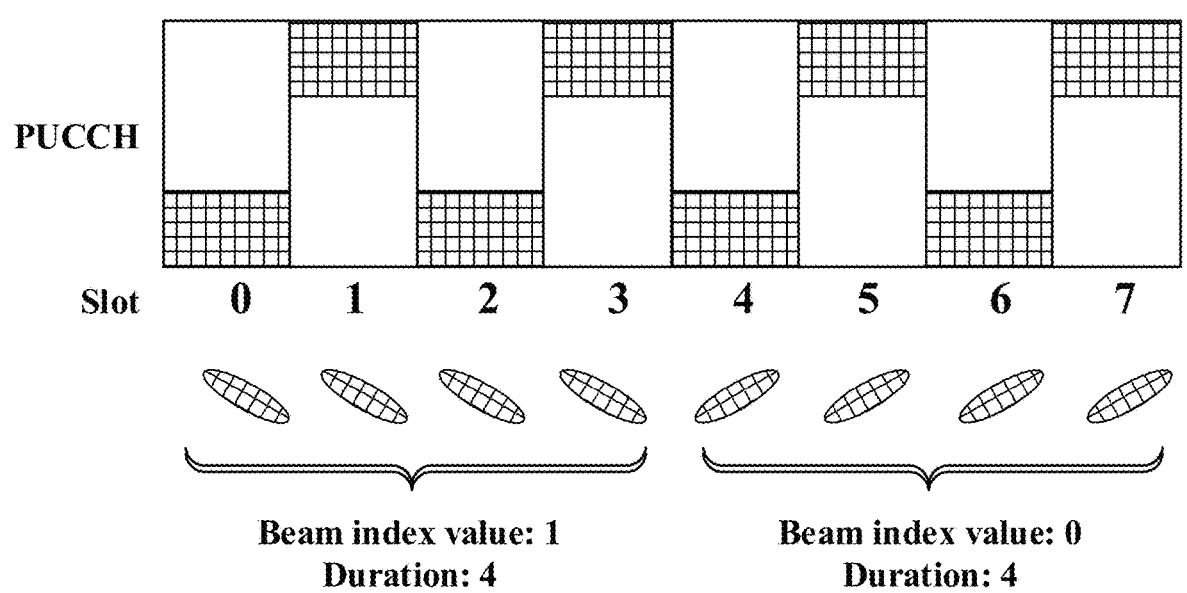
FIG. 15 is a schematic diagram of a beam transmission mode provided by an embodiment of the present disclosure.

When the number of PUCCH repetition transmissions is configured in the higher-layer such that $N_{PUCCH}^{repeat}=8$ and the indicator value is 5, a manner of sending beams by the UE is as shown in FIG. 15.

FIG. 15 is a schematic diagram of a beam transmission mode provided by an embodiment of the present disclosure. As shown in FIG. 15, when the start and length indicator value is 5, it can be learned from Table 4 that a start beam index is 1, the start beam index 1 corresponds to activated S2 and duration 4, and a unit of the duration in the case of inter-slot frequency hopping is a slot. Therefore, a same start beam is used for transmission in a slot 0 to a slot 3. For a slot 4, the beam is switched to a next transmit beam, which is determined according to S1 and then used for transmission in four slots to complete this round of PUCCH repetition transmissions.

In the case of intra-slot frequency hopping, still taking the grouping manner of PUCCH-SpatialRelationInfo in Table 1 as an example, when the MAC-CE activates S1 for the UE, the transmit beam for the UE is determined according to S1 and S2, and the transmit beam for the UE determined according to S1 and S2 corresponds to beam index values 0 and 1, respectively.

Figure 16:
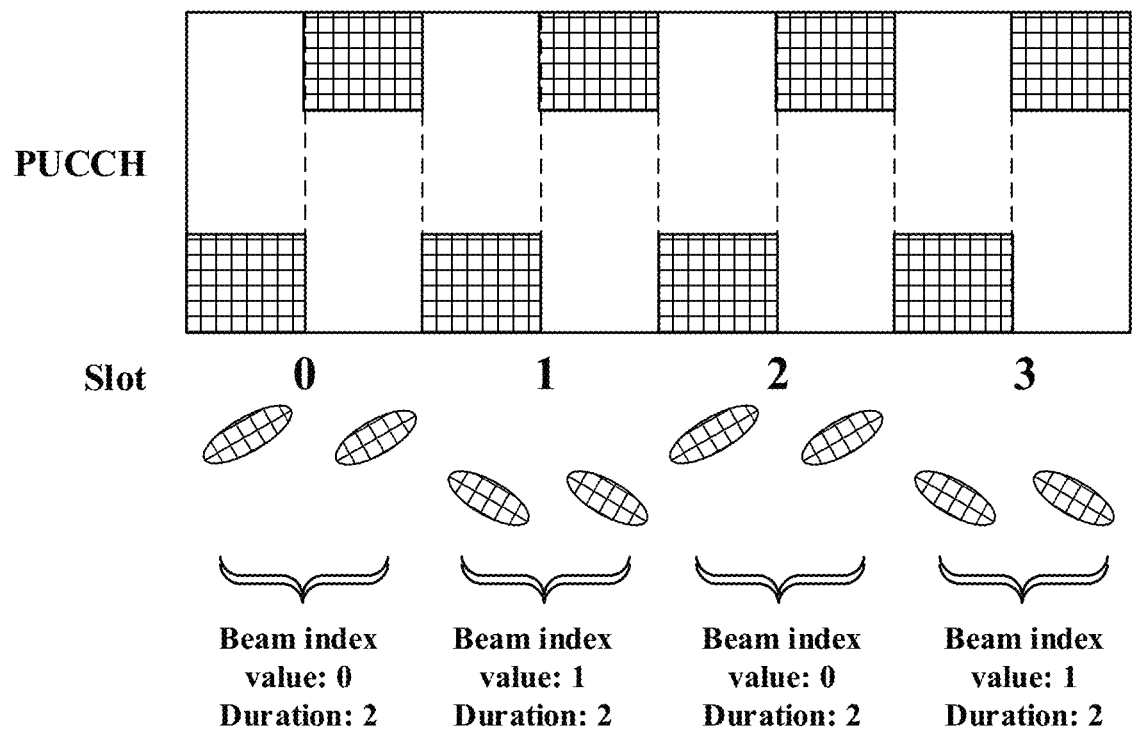
FIG. 16 is a schematic diagram of a beam transmission mode provided by an embodiment of the present disclosure.

When the number of PUCCH repetition transmissions is configured in the higher-layer such that $N_{PUCCH}^{repeat}=4$ and the indicator value is 1, a manner of sending beams by the UE is as shown in FIG. 16.

FIG. 16 is a schematic diagram of a beam transmission mode provided by an embodiment of the present disclosure. As shown in FIG. 16, when the start and length indicator value is 1, it can be learned from Table 4 that an start beam index is 0, the start beam index 0 corresponds to activated S1 and duration 2, and a unit of the duration in the case of inter-slot frequency hopping is a frequency hopping unit. Therefore, a same beam is used for transmission in the first two frequency hopping units, that is, a slot 0. For a slot 1, the beam is switched to a next transmit beam, which is used for transmission in two frequency hopping units, that is, two slots before beam switching is performed.

Figure 17:
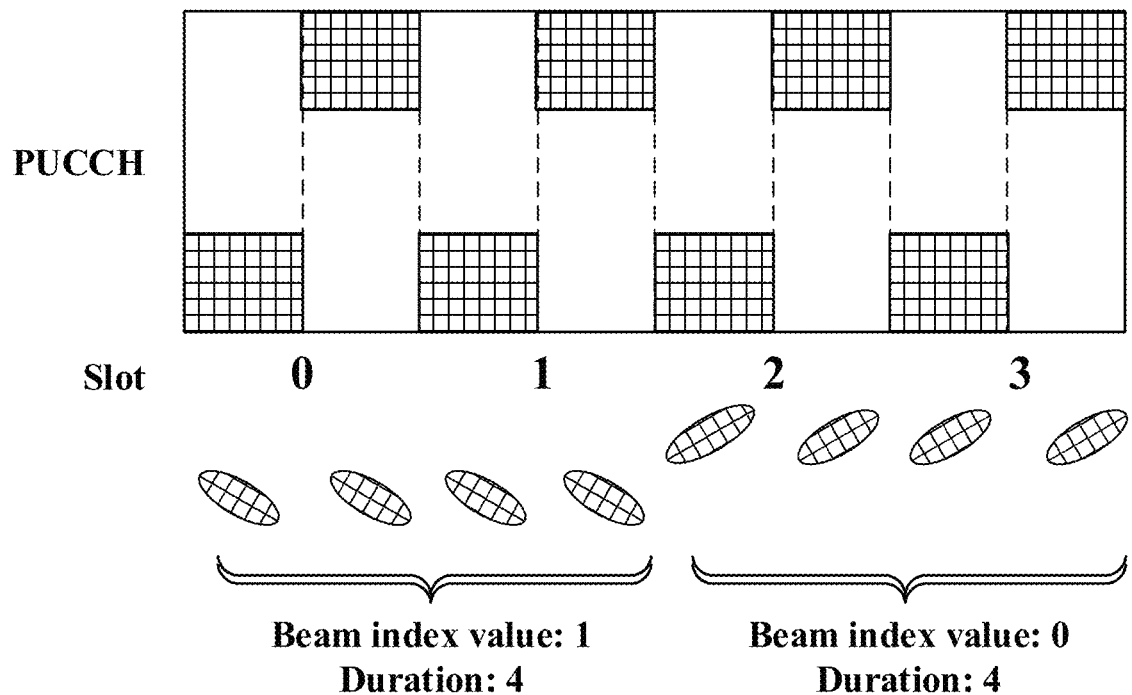
FIG. 17 is a schematic diagram of a beam transmission mode provided by an embodiment of the present disclosure.

When the number of PUCCH repetition transmissions is configured in the higher-layer such that $N_{PUCCH}^{repeat}=4$ and the indicator value is 5, a manner of sending beams by the UE is as shown in FIG. 17.

FIG. 17 is a schematic diagram of a beam transmission mode provided by an embodiment of the present disclosure. As shown in FIG. 17, when the start and length indicator value is 5, it can be learned from Table 4 that a start beam index is 1, the start beam index 1 corresponds to activated S2 and duration 4, and a unit of the duration in the case of inter-slot frequency hopping is a frequency hopping unit. Therefore, a same start beam is used for transmission in a slot 0 and a slot 1. For a slot 2, the beam is switched to a next transmit beam, which is used for transmission in four frequency hopping units to complete this round of PUCCH repetition transmissions.

In an applicative embodiment, the embodiment is used to describe beam indication when uplink OFDM symbols in some slots do not meet a requirement of duration for multi-slot PUCCH transmission during multi-slot PUCCH repetition transmission.

In a frame structure of NR, some slots include not only uplink OFDM symbols, but also downlink OFDM symbols and guard intervals. Therefore, the number of uplink OFDM symbols (or the number of continuous OFDM symbols) included in these slots cannot meet a requirement of duration on each PUCCH for multi-slot PUCCH transmission. When these slots fail to meet a transmission requirement, multi-slot PUCCH transmission skips these slots and continues to repeat in the following slots until the number of transmitted PUCCHs meets the number of repetitions configured in the higher layer.

Figure 18:
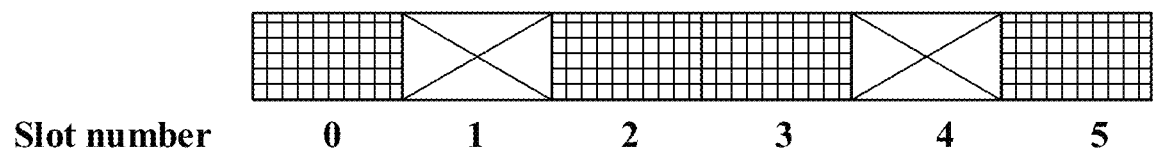
FIG. 18 is a schematic diagram of PUCCH repetition transmissions by UE provided by an embodiment of the present disclosure.

When the number of PUCCH repetition transmissions is configured in the higher layer such that $N_{PUCCH}^{repeat}=4$ and there is a slot which fails to meet the PUCCH transmission requirement, a schematic diagram of PUCCH repetition transmissions by the UE is as shown in FIG. 18.

FIG. 18 is a schematic diagram of PUCCH repetition transmissions by UE provided by an embodiment of the present disclosure. As shown in FIG. 18, a slot 1 and a slot 4 do not meet a PUCCH transmission requirement, so four repetition transmissions indicated by the higher layer are completed in a slot 0, a slot 2, a slot 3 and a slot 5, respectively. In this case, an impact is caused to a corresponding beam configuration. The present disclosure is used to determine the solution to the problem.

Figure 19:
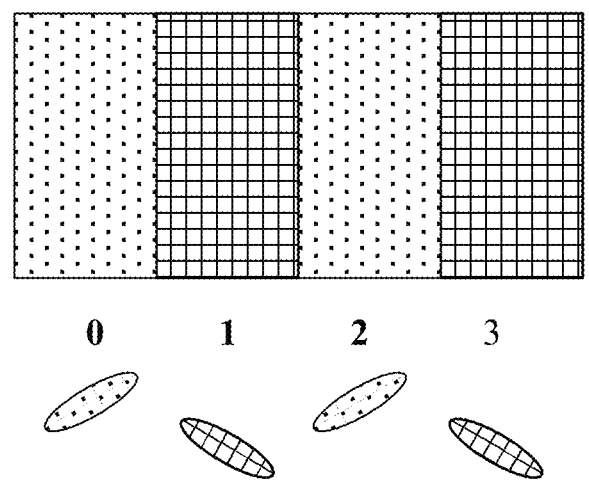
FIG. 19 is a schematic diagram of a beam transmission mode provided by an embodiment of the present disclosure.

FIG. 19 is a schematic diagram of a beam transmission mode provided by an embodiment of the present disclosure. Assuming that the number $N_{PUCCH}^{repeat}=4$ of PUCCH repetition transmissions is configured in the higher layer and four consecutive slots meet the PUCCH transmission requirement, a schematic diagram of beam sending by the UE is as shown in FIG. 19.

Figure 20:
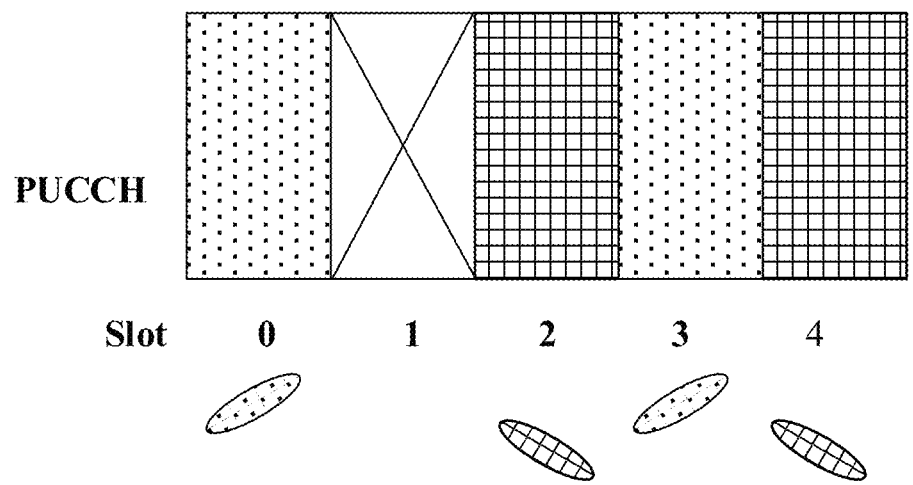
FIG. 20 is a schematic diagram of a beam transmission mode provided by an embodiment of the present disclosure.

When a slot 1 fails to meet the PUCCH transmission requirement, a slot 2 and a slot 3 may have, but do not limited to, the following two transmission schemes:

(1) Beams are postponed in sequence. FIG. 20 is a schematic diagram of a beam transmission mode provided by an embodiment of the present disclosure. A slot 2 uses a beam corresponding to a slot 1, slot 3 uses a beam corresponding to the slot 2, and a beam corresponding to the slot 3 is used in a subsequent slot which meets the PUCCH transmission requirement.

Figure 21:
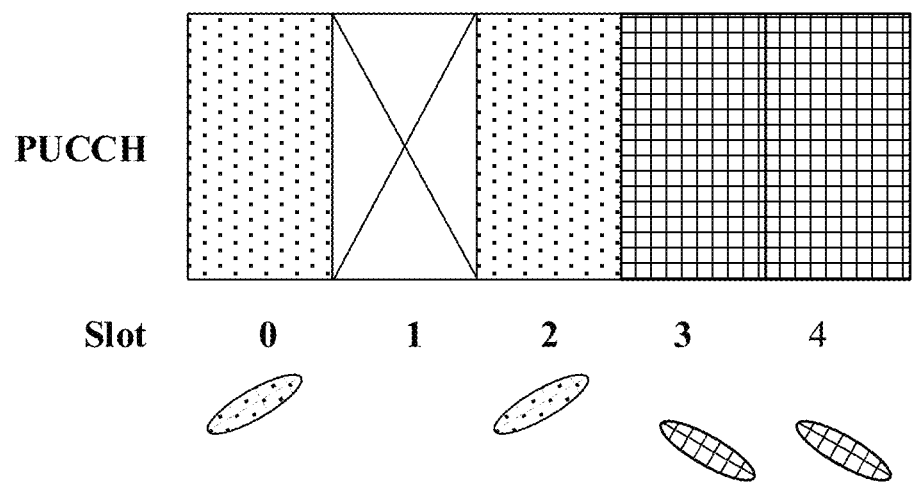
FIG. 21 is a schematic diagram of a beam transmission mode provided by an embodiment of the present disclosure.

(2) Original beams are kept unchanged. FIG. 21 is a schematic diagram of a beam transmission mode provided by an embodiment of the present disclosure. As shown in FIG. 21, original transmit beams are kept unchanged in a slot 2 and a slot 3, and a beam corresponding to the slot 2 is used in a subsequent slot which meets the PUCCH transmission requirement.

In an applicative embodiment, the present disclosure is used to describe a case in which a base station instructs one power adjustment factor to correspond to power control parameters for multiple transmissions during PUCCH repetition transmissions. The power adjustment factor is indicated in a Transmission Power Control Command (TPC command) field to adjust a transmission power for the UE by a corresponding step.

When multiple pieces of spatial-relation information are configured for the UE, multiple transmit beams for the UE are generated according to the different pieces of spatial-relation information, where power control parameters corresponding to each piece of spatial-relation information include: an index j of an open-loop receiver power target value, an index of a path loss estimation pathlossReferenceRSs, and an index of a closed loop. According to the above parameters, the UE can calculate the corresponding transmission power by using the following formula:

$$P = \min[P_{CMAX}, \{P_0(j) + \alpha(k) \cdot PL(q)\} + \{f(l)\} + \{10\lg M + \Delta\}][dBm]$$

where $P_{CMAX}$ represents a maximum allowed transmission power; $PL(q)$ represents a path loss estimation; $P_0(j)$ represents an open-loop receiver power target value; $\alpha(k)$ represents a partial path loss compensation factor, which may be 1 for PUCCH; $F(l)$ represents a power control offset state value; and $10\lg M + \Delta$ represents another adjusting variable. Adjustment information, a power control adjustment state of a closed-loop part is carried by physical layer signaling DCI 1_0 and DCI 1_1, and may further be combined with power control commands of multiple terminals through DCI 2_2. This closed-loop power control information is called power adjustment factor, which is indicated in a TPC command field of DCI. In the case of PUCCH repetition transmission, the DCI only indicates one power adjustment factor for rapid power adjustment, and power adjustment values corresponding to the TPC command fields are as shown in Table 5. When corresponding performance of multiple beams is quite different (for example, a case that a beam is blocked), power adjustment indicated by the base station may match only one of the transmit beams, rather than the other transmit beams.

Figure 22:
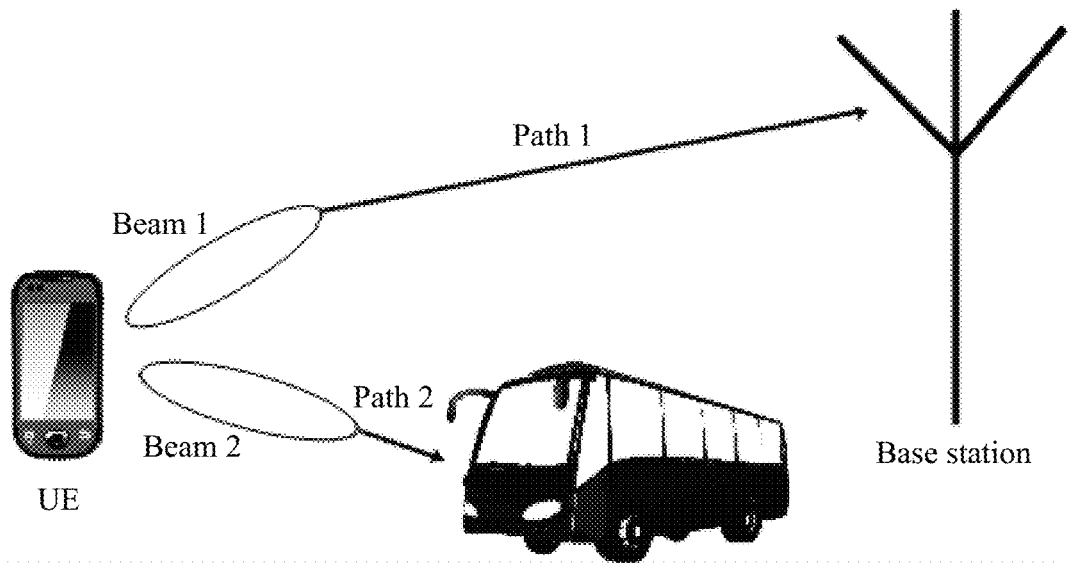
FIG. 22 is a schematic diagram of beams being blocked in an embodiment of the present disclosure.

FIG. 22 is a schematic diagram of beams being blocked in an embodiment of the present disclosure. As shown in FIG. 22, a transmit beam 1 for the UE may be transmitted directly with the base station through a path 1. A transmit beam 2 for the UE is blocked and obstructed by a bus, causing the power adjustment indicated by the base station to match only the transmit beam 1 rather than the transmit beam 2.

TABLE 5

Mapping of a TPC command field in DCI Format 1_0, DCI Format 1_1, or DCI Format 2_2

| TPC Command Field | Power adjustment factor ($\delta_{PUCCH, b, f, c}$) [dB] |
|---|---|
| 0 | −1 |

TABLE 5-continued

Mapping of a TPC command field in DCI Format
1_0, DCI Format 1_1, or DCI Format 2_2

| TPC Command Field | Power adjustment factor ($\delta_{PUCCH,\,b,\,f,\,c}$) [dB] |
|---|---|
| 1 | 0 |
| 2 | 1 |
| 3 | 3 |

As shown in FIG. 22, the UE is configured with two transmit beams, namely, the beam 1 and the beam 2, which correspond to different path losses 1 and 2. In this case, the path 2 is blocked and has a greater path loss, and the base station will find that a transmission power of UE is too low. However, a transmission condition of the path 1 is better, and the base station will find that the transmission power of the UE is too high. If the base station indicates the power adjustment factor for the beam 1 and notifies the UE to reduce the transmission power by 1 dB, the transmission power of sending the beam 2 also needs to be reduced by 1 dB accordingly. However, the original path loss corresponding to the beam 2 is larger, which will lead to worse transmission performance after the transmission power is reduced. However, if the base station indicates the power adjustment factor for the beam 2 and notifies the UE to increase the transmission power by 1 dB, the transmission power of sending the beam 1 also needs to be increased by 1 dB accordingly. This will lead to high transmission power corresponding to the beam 1, even cause interference to transmission of a same time-frequency resource, and consume too much energy, which is not conducive to energy saving.

Therefore, the present disclosure considers the power control problem for each beam when performance of multiple beams is quite different but the base station indicates only one power adjustment factor.

It is assumed that a path loss corresponding to a beam i is PL(i) and a target reception power is P0(i); and a path loss corresponding to a beam j is PL(j) and a target reception power is P0(j). When the base station indicates a power adjustment factor $\delta(i)$ for the beam i through DCI, the beam j will be adaptively adjusted according to the target reception power of the beam j, and $\delta(j)$ corresponding to the beam j can be simply obtained as follows:

$$\delta(j)=\delta(i)+P_0(i)-P_0(j)$$

However, path losses corresponding to the beam i and the beam j are different. Therefore, when the path loss corresponding to the beam j is large, if a calculated adaptive adjustment value is so large that may cause excessive large power and waste of resources and even interference to other transmission signals, it is necessary to consider the adaptive adjustment scheme in this case independently.

It is specified $\delta=\delta(i)+P_0(i)-P_0(j)$. When $\delta>0$, considering the target reception power and the path loss factor, the $\delta(j)$ corresponding to the beam j can be obtained as follows:

$$\delta(j) = \begin{cases} \delta \cdot \dfrac{PL(j) - PL(i)}{PL(j)}, & PL(j) > PL(i) \\ \delta, & PL(j) \leq PL(i) \end{cases}$$

In summary of the above formulas, the final $\delta(j)$ corresponding to the beam j is obtained as follows:

$$\delta(j) = \begin{cases} (\delta(i) + P_0(i) - P_0(j)) \cdot \dfrac{PL(j) - PL(i)}{PL(j)}, & \delta(i) + P_0(i) - P_0(j) > 0 且 PL(j) > PL(i) \\ \delta(i) + P_0(i) - P_0(j), & 其他 \end{cases}$$

According to the above formulas, $\delta(j)$ corresponding to the beam j can be calculated. The UE will adjust the transmission power accordingly, so that in the case that the base station side indicates only one power adjustment factor through DCI, the transmission power of multiple beams can be adjusted to match multiple sets of power control parameters of the multiple beams.

Figure 23:
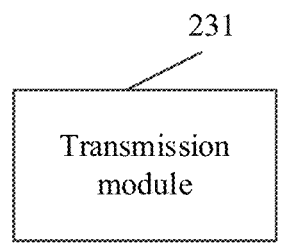
FIG. 23 is a schematic diagram of a transmission apparatus provided by an embodiment of the present disclosure.

In an embodiment, The present disclosure provides a transmission apparatus, of which a schematic diagram is shown in FIG. 23. The method may be applied to a case of repetition transmission between a base station and a terminal. The method may be performed by a transmission apparatus provided by the present disclosure, and the transmission apparatus may be implemented by software and/or hardware.

As shown in FIG. 23, the transmission apparatus provided by the embodiment of the present disclosure mainly includes a transmission module 231.

The transmission module 231 is configured to acquire PUCCH parameters and perform at least one slot repetition transmission according to the PUCCH parameters, where the parameter is configured by higher-layer signaling, and includes at least one of: a plurality of spatial relation information groups, or a frequency hopping transmission parameter; each piece of spatial relation information corresponding to a set of power control parameters.

In an illustrative implementation, in response to multiple PUCCH repetition transmissions being in a same BWP, a MAC-CE pairs the configured spatial relation information to generate N new spatial relation information groups.

MAC-CE activation states correspond to the different spatial relation information groups.

A transmit beam for UE is determined by a spatial relation in a spatial relation information group activated by the MAC-CE.

A transmit beam for the UE is determined by first spatial relation information and second spatial relation information in the spatial relation information group, where the first spatial relation information and the second spatial relation information are the same, or the first spatial relation information and the second spatial relation information are different.

In response to a frequency hopping mode being inter-slot frequency hopping and there being M repetition transmissions, a PUCCH transmit beam in an even-numbered slot is determined by the first spatial relation information in the spatial relation information group; and a PUCCH transmit beam in an odd-numbered slot is determined by the second spatial relation information in the spatial relation information group.

In response to the frequency hopping mode being inter-slot frequency hopping and there being M repetition transmissions, a PUCCH transmit beam in the first M/2 slots is determined by the first spatial relation information in the spatial relation information group; and a PUCCH transmit beam in the remaining slots is determined by the second spatial relation information in the spatial relation information group.

In response to the frequency hopping mode being intra-slot frequency hopping and there being M repetition transmissions, a PUCCH transmit beam on an even-numbered frequency hopping unit is determined by the first spatial relation information in the spatial relation information group; and a PUCCH transmit beam on an odd-numbered frequency hopping unit is determined by the second spatial relation information in the spatial relation information group, where the first spatial relation information and the second spatial relation information are different.

In response to the frequency hopping mode being intra-slot frequency hopping and there being M repetition transmissions, a PUCCH transmit beam in the first M/2 frequency hopping units is determined by the first spatial relation information in the spatial relation information group; and a PUCCH transmit beam in the remaining frequency hopping units is determined by the second spatial relation information in the spatial relation information group.

In an illustrative implementation, in response to PUCCH repetition transmissions being in different BWPs, spatial relation information configured for the different BWPs is paired to generate N new spatial relation information groups.

The transmit beam for the UE is determined by third spatial relation information and fourth spatial relation information in a spatial relation information group, where the third spatial relation information corresponds to a first BWP, and the fourth spatial relation information corresponds to a second BWP.

In response to the frequency hopping mode being inter-slot frequency hopping and there being M repetition transmissions, a PUCCH transmit beam for the UE in a slot in the first BWP is determined by the third spatial relation information in the spatial relation information group; and a transmit beam for the PUCCH, in a slot in the second BWP, for the UE is determined by the fourth spatial relation information in the spatial relation information group.

In response to the frequency hopping mode being intra-slot frequency hopping and there being M repetition transmissions, a PUCCH transmit beam for the UE on a frequency hopping unit in the first BWP is determined by the third spatial relation information in the spatial relation information group; and a transmit beam for the PUCCH, on a frequency hopping unit in the second BWP, for the UE is determined by the fourth spatial relation information in the spatial relation information group.

In an illustrative implementation, in response to a plurality of beams being configured, a manner of sending the beams by the UE is indicated by at least one of the following indication information: downlink dynamic control information; or higher-layer signaling.

A start beam for a PUCCH in a repetition transmission and the number of PUCCHs transmitted corresponding to the beam are determined based on the at least one indication information.

The start beam and the number of PUCCHs transmitted using the beam are determined by a start beam index corresponding to a pre-configured indicator value index and duration.

A unit of duration corresponding to the start beam is a slot (inter-slot frequency hopping or non-frequency hopping) or a frequency hopping unit (intra-slot frequency hopping).

In an illustrative implementation, in response to a slot failing to meet a PUCCH transmission requirement, a beam after the slot is transmitted in one of the following manners: postponing beams in sequence, that is, keeping an original beam sequence unchanged; or keeping original beams unchanged, that is, deleting a beam corresponding to the slot failing to meet the transmission requirement.

In an illustrative implementation, in response to the base station indicating only a power adjustment factor corresponding to a first beam, a power adjustment factor for a second beam is determined using the power adjustment factor.

The power adjustment factor for the second beam is determined by the power adjustment factor indicated by the base station and a power control parameter corresponding to the first beam.

In response to a path loss of the second beam being greater than a path loss of the first beam and a target reception power of the second beam being less than an adjusted target reception power of the first beam, the power adjustment factor for the second beam is determined by a target reception power of the first beam, the path loss of the first beam, the target reception power of the second beam, and the path loss of the second beam.

The transmission apparatus provided in this embodiment can perform the transmission method provided in any of the embodiments of the present disclosure, and has the corresponding functional modules for performing the method. For technical details not described in detail in this embodiment, reference may be made to the transmission method provided in any of the embodiments of the present disclosure.

In the above embodiments of the transmission apparatus, the units and modules included are divided only according to functional logic, but are not limited to the above division, as long as the corresponding functions can be achieved. In addition, the names of the functional units are only for the convenience of distinguishment, and are not used to limit the scope of protection of the present disclosure.

Figure 24:
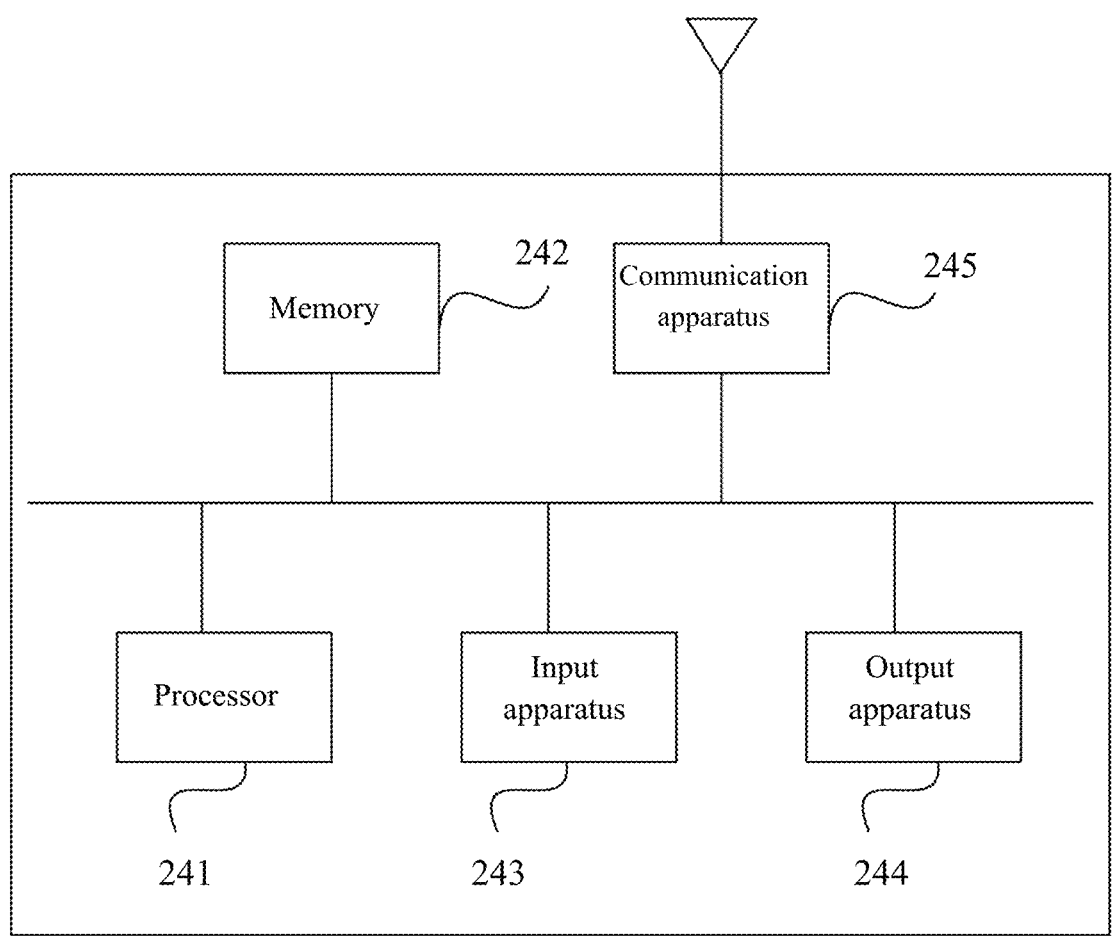
FIG. 24 is a schematic diagram of a device provided by an embodiment of the present disclosure.

A further embodiment of the present disclosure provides a device, of which a schematic diagram is shown in FIG. 24. As shown in FIG. 24, the device includes a processor 241, a memory 242, an input apparatus 243, an output apparatus 244, and a communication apparatus 245. There may be one or more processors 241 in the device, and one processor 241 is shown as an example in FIG. 24. The processor 241, the memory 242, the input apparatus 243, and the output apparatus 244 in the device can be connected by a bus or in other ways. In FIG. 24, the connection is realized by a bus as an example.

The memory 242, as a computer-readable storage medium, may be used to store software programs, computer-executable programs, and modules, such as the program instructions/modules (e.g., the transmission module 231 in the transmission apparatus) corresponding to the transmission method in the embodiments of the present disclosure. The processor 241 executes various functional applications of the device as well as data processing by running the software programs, instructions, and modules stored in the memory 242, i.e., to implement any of the methods provided in the embodiments of present disclosure.

The memory 242 may mainly include a storage program area and a storage data area, where the storage program area may store an operating system and application program(s) required by at least one function, and the storage data area may store data created according to the use of the device, etc. The memory 242 may include a high-speed random access memory and a non-volatile memory, for example, at least one magnetic disk storage device, a flash memory device, or another non-volatile solid-state storage device. In some examples, the memory 242 may include memories remotely located with respect to the processor 241, and these remote memories may be connected to devices via a network. Examples of the above-mentioned network include the Internet, an intranet, a local area network, a mobile communication network, and a combination thereof.

The input apparatus 243 may be configured to receive an input numerical digit or character information and generate a key signal input related to user settings and function control of the device. The output apparatus 244 may include a display device such as a display screen.

The communication apparatus 245 may include a receiver and a transmitter. The communication apparatus 245 is configured to transmit and receive information according to control of the processor 241.

A further embodiment of the present disclosure provides a storage medium containing computer-executable instructions which, when executed by a computer processor, cause the computer processor to execute a transmission method, the method including: acquiring physical uplink control channel (PUCCH) parameters and performing at least one slot repetition transmission according to the PUCCH parameters, where the parameter is configured by higher-layer signaling, and includes at least one of: a plurality of spatial relation information groups, or a frequency hopping transmission parameter; each piece of spatial relation information corresponding to a set of power control parameters.

An embodiment of the present disclosure provides a storage medium including computer-executable instructions, where the computer-executable instructions are not limited to the method operations as described above, but may also perform the relevant operations in the transmission method according to any embodiment of the present disclosure.

Through the description of the above embodiments, those having ordinary skill in the art can understand that the present disclosure may be implemented by means of software and general-purpose hardware, and of course may alternatively be implemented by hardware. Based on this understanding, the technical schemes of the present disclosure may be embodied in the form of software products, which may be stored in a computer-readable storage medium (such as a floppy disk, read-only memory (ROM), random access memory (RAM), flash, hard disk and optical disk) and include instructions to cause a computer device (such as a personal computer, a server, or a network device) to perform the methods of the embodiments of the present disclosure.

The above-described embodiments are only illustrative embodiments of the present disclosure, and are not intended to limit the scope of protection of the present disclosure.

Those having ordinary skill in the art should understand that the term "user terminal" covers any suitable type of wireless user equipment, such as mobile phones, portable data processing equipment, portable web browsers or vehicle-mounted mobile stations.

Generally speaking, various embodiments of the present disclosure may be implemented in hardware or dedicated circuits, software, logic, or any combination thereof. For example, some aspects may be implemented in hardware, while other aspects may be implemented in firmware or software that may be executed by a controller, a microprocessor or another computing device. However, the present disclosure is not limited thereto.

Embodiments of the present disclosure may be implemented by a data processor of a mobile device executing computer program instructions, for example, in a processor entity, or by hardware, or by a combination of software and hardware. The computer program instructions may be assembly instructions, Instruction Set Architecture (ISA) instructions, machine instructions, machine-related instructions, microcode, firmware instructions, state setting data or source code or object code written in any combination of one or more programming languages.

The block diagram of any logic process in the drawings of the present disclosure may represent program steps, or may represent interconnected logic circuits, modules and functions, or may represent a combination of program steps and logic circuits, modules and functions. The computer program may be stored in a memory. The memory may be of any type that is suitable for a local technical environment and can be implemented using any suitable data storage technology, for example but not limited to, a read-only memory (ROM), a random-access memory (RAM), optical storage devices and systems (a digital versatile disk (DVD) or a compact disk (CD)). The computer-readable medium may include a non-transitory storage medium. The data processor may be any type suitable for the local technical environment, for example but not limited to, a general-purpose computer, a special-purpose computer, a microprocessor, a digital signal processor (DSP), an application-specific integrated circuit (ASIC), a field-programmable gate array (FPGA) and a processor based on a multi-core processor architecture.

The invention claimed is:

1. A transmission method, comprising:
acquiring a physical uplink control channel (PUCCH) parameter, and performing PUCCH repetition transmissions according to the PUCCH parameter,
wherein the PUCCH parameter is configured by higher-layer signaling, and comprises at least one of:
a plurality of spatial relation information groups, or
a frequency hopping transmission parameter, each piece of spatial relation information corresponding to a set of power control parameters,
wherein in response to the PUCCH repetition transmissions being in different bandwidth parts (BWPs), spatial relation information configured for the different BWPs is paired to generate N new spatial relation information groups, wherein N is an integer greater than or equal to 1,
wherein a transmit beam for user equipment (UE) is determined by third spatial relation information and fourth spatial relation information in a spatial relation information group activated by a medium access control-control element (MAC-CE), the third spatial relation information corresponds to a first BWP, and the fourth spatial relation information corresponds to a second BWP.

2. The method of claim 1, wherein in response to the PUCCH repetition transmissions being in a same BWP,
the MAC-CE pairs spatial relation information to generate N new spatial relation information groups,
wherein N is an integer greater than or equal to 1.

3. The method of claim 2, wherein MAC-CE activation states correspond to the different spatial relation information groups.

4. The method of claim 2, wherein the transmit beam for UE is determined by spatial relation information in a spatial relation information group activated by the MAC-CE.

5. The method of claim 2, wherein the transmit beam for UE is determined by first spatial relation information and second spatial relation information in a spatial relation information group, wherein
the first spatial relation information and the second spatial relation information are the same, or
the first spatial relation information and the second spatial relation information are different.

6. The method of claim 5, wherein in response to a PUCCH frequency hopping mode being inter-slot frequency hopping and there being M repetition transmissions,
   a PUCCH transmit beam in an even-numbered slot is determined by first spatial relation information in a spatial relation information group activated by the MAC-CE; and
   a PUCCH transmit beam in an odd-numbered slot is determined by second spatial relation information in the spatial relation information group activated by the MAC-CE.

7. The method of claim 5, wherein in response to a PUCCH frequency hopping mode being inter-slot frequency hopping and there being M repetition transmissions,
   a PUCCH transmit beam in the first M/2 slots is determined by first spatial relation information in a spatial relation information group activated by the MAC-CE, wherein M is an even number; and
   a PUCCH transmit beam in the remaining slots is determined by second spatial relation information in the spatial relation information group activated by the MAC-CE.

8. The method of claim 5, wherein in response to a PUCCH frequency hopping mode being intra-slot frequency hopping and there being M repetition transmissions,
   a PUCCH transmit beam on an even-numbered frequency hopping unit is determined by first spatial relation information in a spatial relation information group activated by the MAC-CE; and
   a PUCCH transmit beam on an odd-numbered frequency hopping unit is determined by second spatial relation information in the spatial relation information group activated by the MAC-CE.

9. The method of claim 5, wherein in response to a PUCCH frequency hopping mode being intra-slot frequency hopping and there being M repetition transmissions,
   a PUCCH transmit beam in the first M/2 frequency hopping units is determined by first spatial relation information in a spatial relation information group activated by the MAC-CE, wherein M/2 is an even number; and
   a PUCCH transmit beam in the remaining frequency hopping units is determined by second spatial relation information in the spatial relation information group activated by the MAC-CE.

10. The method of claim 1, wherein
   in response to a PUCCH frequency hopping mode being inter-slot frequency hopping and there being M repetition transmissions,
      a PUCCH transmit beam for the UE in a slot in the first BWP is determined by the third spatial relation information in the spatial relation information group activated by the MAC-CE; and
      a PUCCH transmit beam for the UE in a slot in the second BWP is determined by the fourth spatial relation information in the spatial relation information group;
      and
   in response to a PUCCH frequency hopping mode being intra-slot frequency hopping and there being M repetition transmissions,
      a PUCCH transmit beam for the UE on a frequency hopping unit in the first BWP is determined by the third spatial relation information in the spatial relation information group activated by the MAC-CE; and
      a PUCCH transmit beam for the UE on a frequency hopping unit in the second BWP is determined by the fourth spatial relation information in the spatial relation information group.

11. The method of claim 1, wherein in response to a plurality of beams being configured, a form of the transmit beam for UE is indicated by at least one of the following indication information:
   downlink dynamic control information; or
   higher-layer signaling.

12. The method of claim 11, further comprising:
   determining, based on the at least one piece of indication information, a start beam for PUCCHs in the repetition transmissions and the number of PUCCHs transmitted corresponding to the start beam.

13. The method of claim 12, wherein
   the start beam and the number of PUCCHs transmitted using the start beam are determined by a start beam index corresponding to a pre-configured indicator value index and duration corresponding to the indicator value index; or
   a unit of duration corresponding to the start beam is a slot or a frequency hopping unit.

14. The method of claim 1, wherein in response to a slot failing to meet a PUCCH transmission requirement, a beam after the slot is transmitted in one of the following manners:
   keeping an original beam sequence unchanged; or
   deleting a beam corresponding to the slot failing to meet the transmission requirement.

15. The method of claim 1, wherein
   in response to a base station indicating only a power adjustment factor corresponding to a first beam, a power adjustment factor for a second beam is determined using the power adjustment factor.

16. The method of claim 15, wherein
   the power adjustment factor for the second beam is determined by the power adjustment factor indicated by the base station and a power control parameter corresponding to the first beam; or
   in response to a path loss of the second beam being greater than a path loss of the first beam and a target reception power of the second beam being less than an adjusted target reception power of the first beam,
      the power adjustment factor for the second beam is determined by a target reception power of the first beam,
      the path loss of the first beam, the target reception power of the second beam,
   and
      the path loss of the second beam.

17. A device, comprising:
   at least one processor; and
   a memory configured to store at least one program, wherein the at least one program, when executed by the at least one processor, causes the at least one processor to implement a transmission method which comprises:
      acquiring a physical uplink control channel (PUCCH) parameter, and performing PUCCH repetition transmissions according to the PUCCH parameter,
      wherein the PUCCH parameter is configured by higher-layer signaling, and
      comprises at least one of: a plurality of spatial relation information groups, or
      a frequency hopping transmission parameter, each piece of spatial relation information corresponding to a set of power control parameters, wherein in response to the PUCCH repetition transmissions being in different bandwidth parts (BWPs), spatial relation information configured for the different BWPs is paired to generate N new spatial relation information groups, wherein N is an integer greater than or equal to 1, wherein a transmit beam for user equipment (UE) is determined by third spatial relation information and fourth spatial relation information in a spatial relation information group activated by a medium access control-control element (MAC-CE), the third spatial relation information corresponds to a first BWP, and the fourth spatial relation information corresponds to a second BWP.

18. A non-transitory computer-readable storage medium storing a computer program which, when executed by a processor, causes the processor to implement the method of claim 1.

\* \* \* \* \*